United States Patent
Hu et al.

(10) Patent No.: US 12,512,873 B2
(45) Date of Patent: Dec. 30, 2025

(54) METHOD OF ESTIMATING LOCAL OSCILLATOR LEAKAGE

(71) Applicant: Hong Kong Applied Science And Technology Research Institute Co., Ltd., Hong King (HK)

(72) Inventors: Hong Hu, Tai Po (HK); Jianping Zheng, Eastern District (HK); Xiangyu Liu, Shenzhen (CN); Yuxian Zhang, Tai Po (HK)

(73) Assignee: Hong Kong Applied Science And Technology Research Institute Co., Ltd, Shatin (HK)

( * ) Notice: Subject to any disclaimer, the term of this patent is extended or adjusted under 35 U.S.C. 154(b) by 319 days.

(21) Appl. No.: 18/484,809

(22) Filed: Oct. 11, 2023

(65) Prior Publication Data
US 2025/0125832 A1    Apr. 17, 2025

(51) Int. Cl.
*H04B 1/525*    (2015.01)
*H04B 1/48*    (2006.01)

(52) U.S. Cl.
CPC ....... *H04B 1/525* (2013.01); *H04B 2001/485* (2013.01)

(58) Field of Classification Search
None
See application file for complete search history.

(56) References Cited

U.S. PATENT DOCUMENTS

| | | | | |
|---|---|---|---|---|
| 5,444,864 A | * | 8/1995 | Smith | H04B 1/408 455/24 |
| 6,148,047 A | * | 11/2000 | Mohindra | H04L 27/142 329/320 |
| 6,470,055 B1 | * | 10/2002 | Feher | H04L 27/00 370/215 |
| 7,130,607 B2 | * | 10/2006 | Khorram | H04B 1/406 327/116 |

(Continued)

FOREIGN PATENT DOCUMENTS

| | | | | |
|---|---|---|---|---|
| AT | 408395 B | * | 11/2001 | ....... H04L 27/26265 |
| CN | 1238878 A | * | 12/1999 | ......... H04L 27/3863 |

(Continued)

OTHER PUBLICATIONS

Yamada et al. Cancellation techniques for LO leakage and Dc offset in direct conversion systems, IEEE 2008, pp. 1191-1194 (Year: 2008).*

(Continued)

*Primary Examiner* — Berhanu Tadese
(74) *Attorney, Agent, or Firm* — GableGotwals

(57) ABSTRACT

A method of estimating local oscillator leakage (LOL) for a radio frequency (RF) signal transmitter. The method comprises generating a transmitter wideband baseband signal (s(t)) with a direct current (DC) voltage element of the transmitter wideband baseband signal (s(t)) removed or blocked and an average of the transmitter wideband baseband signal (s(t)) set to zero. The method includes processing said transmitter wideband baseband signal (s(t)) to form a RF signal; processing the RF signal to obtain a receiver (Continued)

baseband signal (y(t)); and determining a magnitude of an average of the receiver baseband signal (y(t)) as comprising a magnitude of the transmitter DC offset.

20 Claims, 17 Drawing Sheets

(56) References Cited

U.S. PATENT DOCUMENTS

| | | | | |
|---|---|---|---|---|
| 7,443,924 B2* | 10/2008 | Dale | H03B 21/02 | 375/317 |
| 7,483,492 B2* | 1/2009 | Feher | H04B 7/0871 | 375/267 |
| 7,496,343 B2* | 2/2009 | Khorram | H03D 7/1441 | 455/317 |
| 7,657,236 B2* | 2/2010 | Pan | H04B 1/30 | 455/114.2 |
| 7,715,836 B2* | 5/2010 | Vassiliou | H04B 17/20 | 455/67.11 |
| 7,738,608 B2* | 6/2010 | Feher | H04L 7/0008 | 375/267 |
| 7,995,973 B2* | 8/2011 | Dent | H04B 1/525 | 455/87 |
| 8,226,003 B2* | 7/2012 | Frederick | H04B 1/525 | 340/10.3 |
| 8,611,445 B2* | 12/2013 | Rajendran | H04B 7/0871 | 375/219 |
| 8,855,580 B2* | 10/2014 | Dent | H04B 1/525 | 455/296 |
| 9,425,851 B2* | 8/2016 | Guo | H04B 1/44 | |
| 9,787,415 B2* | 10/2017 | Fan | H04B 1/525 | |
| 10,326,632 B2* | 6/2019 | Cui | H04L 27/2659 | |
| 10,698,095 B1* | 6/2020 | Peral | G01S 13/0209 | |
| 11,063,618 B2* | 7/2021 | Venkatraman | H04L 25/0202 | |
| 12,314,815 B2* | 5/2025 | Szmuk | G06N 10/40 | |
| 12,375,115 B2* | 7/2025 | Alavi | H04B 1/1676 | |
| 2005/0101269 A1* | 5/2005 | Dale | H03B 21/02 | 455/109 |
| 2005/0175116 A1* | 8/2005 | Feher | H04B 7/0854 | 375/267 |
| 2007/0042728 A1* | 2/2007 | Pan | H04B 1/30 | 455/127.1 |
| 2007/0280379 A1* | 12/2007 | Wong | H04L 25/06 | 375/332 |
| 2008/0056397 A1* | 3/2008 | Li | H04L 27/3863 | 375/260 |
| 2008/0056399 A1* | 3/2008 | Feher | H04L 27/18 | 375/260 |
| 2008/0212656 A1* | 9/2008 | Feher | H04B 1/707 | 375/150 |
| 2009/0017780 A1* | 1/2009 | Dale | H04B 1/68 | 455/115.1 |
| 2011/0243202 A1* | 10/2011 | Lakkis | H04B 1/525 | 375/219 |
| 2012/0076241 A1* | 3/2012 | Rajendran | H04B 7/0689 | 375/329 |
| 2014/0321516 A1* | 10/2014 | Al-Qaq | H04B 17/29 | 375/221 |
| 2015/0118980 A1* | 4/2015 | Leung | H04B 17/14 | 455/114.2 |
| 2017/0118060 A1* | 4/2017 | Cui | H04L 27/26524 | |
| 2019/0273531 A1* | 9/2019 | Waxman | H04B 1/715 | |
| 2020/0110152 A1* | 4/2020 | Yankevich | G01S 13/24 | |
| 2021/0083697 A1* | 3/2021 | Venkatraman | H04B 1/04 | |
| 2023/0163798 A1* | 5/2023 | Alavi | H04B 1/707 | 455/552.1 |
| 2024/0106490 A1* | 3/2024 | Mishra | H04B 1/30 | |
| 2024/0214958 A1* | 6/2024 | Mohammed | H04W 56/0035 | |
| 2025/0125832 A1* | 4/2025 | Hu | H04B 1/525 | |

FOREIGN PATENT DOCUMENTS

| | | | | |
|---|---|---|---|---|
| CN | 1269092 A | | 10/2000 | |
| CN | 1172500 C | * | 10/2004 | H04L 27/3863 |
| CN | 101090506 A | * | 12/2007 | |
| CN | 103684330 A | * | 3/2014 | |
| CN | 103918187 A | | 7/2014 | |
| CN | 103986686 A | | 8/2014 | |
| CN | 104052507 A | * | 9/2014 | H04B 15/04 |
| CN | 102739584 B | | 4/2015 | |
| CN | 104811404 A | | 7/2015 | |
| CN | 104821826 A | * | 8/2015 | |
| CN | 104935539 A | * | 9/2015 | H04L 25/06 |
| CN | 105577594 A | * | 5/2016 | H04B 17/11 |
| CN | 102916694 B | * | 8/2016 | |
| CN | 105850063 A | * | 8/2016 | H04B 1/38 |
| CN | 103918187 B | * | 10/2016 | H04W 24/08 |
| CN | 104052507 B | * | 4/2017 | H04B 15/04 |
| CN | 104811404 B | * | 11/2017 | |
| CN | 104821826 B | * | 4/2018 | |
| CN | 104935539 B | * | 2/2019 | H04L 25/06 |
| CN | 111181594 A | | 5/2020 | |
| CN | 112383365 A | | 2/2021 | |
| CN | 112436857 A | * | 3/2021 | H04B 17/10 |
| CN | 112511175 A | * | 3/2021 | H04B 1/0475 |
| CN | 112615641 A | | 4/2021 | |
| CN | 112737610 A | | 4/2021 | |
| CN | 112436857 B | * | 3/2022 | H04B 17/10 |
| CN | 116057843 A | * | 5/2023 | H04B 1/0475 |
| CN | 112511175 B | * | 6/2023 | H04B 1/0475 |
| CN | 112737610 B | * | 7/2023 | H04B 1/04 |
| CN | 116698002 A | * | 9/2023 | G01C 19/5607 |
| CN | 119923800 A | * | 5/2025 | H04B 1/0067 |
| CN | 120188421 A | * | 6/2025 | H04B 1/525 |
| EP | 1665642 B1 | * | 11/2010 | H04W 72/046 |
| EP | 2779472 A2 | * | 9/2014 | H04B 1/525 |
| EP | 2779472 B1 | * | 4/2016 | H04B 1/525 |
| FI | 117494 B | * | 10/2006 | H04L 27/3863 |
| JP | 2006295540 A | * | 10/2006 | |
| JP | 2025015546 A | * | 1/2025 | H04B 1/525 |
| JP | 2025020162 A | * | 2/2025 | H04B 1/525 |
| KR | 20100115015 A | * | 10/2010 | H04B 1/16 |
| KR | 20100134205 A | * | 12/2010 | H10D 99/00 |
| KR | 20160078425 A | * | 7/2016 | H04B 17/11 |
| TW | 1392299 B | * | 4/2013 | H04B 1/26 |
| WO | WO-9957912 A2 | * | 11/1999 | H04L 27/142 |
| WO | WO-0013382 A1 | * | 3/2000 | H04L 27/18 |
| WO | WO-2004023667 A1 | * | 3/2004 | H04B 17/20 |
| WO | WO-2007127948 A2 | * | 11/2007 | G06K 7/0008 |
| WO | WO-2008027441 A2 | * | 3/2008 | H04B 1/30 |
| WO | WO-2009156510 A2 | * | 12/2009 | H04B 1/525 |
| WO | WO-2012065398 A1 | * | 5/2012 | H04L 27/3836 |
| WO | WO-2013067699 A1 | * | 5/2013 | H04B 1/525 |
| WO | WO-2015065680 A1 | * | 5/2015 | H04B 17/11 |
| WO | WO-2015139474 A1 | * | 9/2015 | H04B 1/52 |
| WO | WO-2017144962 A1 | * | 8/2017 | A61P 37/08 |
| WO | WO-2022020278 A1 | * | 1/2022 | H04B 17/354 |
| WO | WO-2024063919 A1 | * | 3/2024 | H04B 1/525 |
| WO | WO-2025076854 A1 | * | 4/2025 | H04B 1/525 |
| WO | WO-2025076854 A9 | * | 5/2025 | H04B 1/525 |

OTHER PUBLICATIONS

Michaelsen et al. Investigation of LO-leakage cancellation and DC-offset influence on flicker-noise in X-band mixers, IEEE 2012, pp. 99-102 (Year: 2012).*

M. Faulkner, "IM2 removal in direct conversion receivers," IEEE VTS 53rd Vehicular Technology Conference, Spring 2001. Proceedings (Cat. No. 01CH37202), Rhodes, Greece, 2001, pp. 1897-1901 vol.3 (Year: 2001).*

P. Handel and P. Zetterberg, "Receiver I/Q Imbalance: Tone Test, Sensitivity Analysis, and the Universal Software Radio Peripheral," in IEEE Transactions on Instrumentation and Measurement, vol. 59, No. 3, pp. 704-714, Mar. 2010, (Year: 2010).*

* cited by examiner

METHOD OF ESTIMATING LOCAL OSCILLATOR LEAKAGE

FIELD OF THE INVENTION

The invention relates to a method of estimating local oscillator leakage (LOL) for a radio frequency (RF) transmitter and/or receiver. The method relates particularly, but not exclusively, to a method of estimating LOL using a wideband baseband signal. The method also relates particularly, but not exclusively, to a method of estimating LOL in Zero-IF (Intermediate Frequency) systems.

BACKGROUND OF THE INVENTION

Zero-IF is the most widely used architecture in 5G cellular base stations because of low design costs and high RF performance. However, DC offset, i.e., LOL, is almost inevitable and degrades RF performance as it causes an unwanted emission signal within the desired transmission signal. DC offset degrades constellation and affects modulation quality.

DC refers to the steady voltage (DC element or component) present in a waveform (signal) that is not part of the intended signal. In other words, it comprises the average value of the signal, as opposed to the variations or alternating current (AC) elements or components of the signal. DC offset occurs when most of the AC elements or components of the signal are either above or below the intended DC line, i.e., the signal is not equally set with respect to the DC line, but more than half of the energy or power of the AC elements or components are either above or below the DC line. Another way of expressing this is that the amplitude of the signal has been displaced away from the intended DC line. In Zero-IF systems, the intended DC line is set at zero.

An RF mixer has two input ports and one output port. The ideal mixer will produce an output that is the product of the two inputs. In frequency terms, the output should only comprise sidebands $[F_{IN}+F_{LO}]$ and $[F_{IN}-F_{LO}]$, where $F_{IN}$ is the converted analog version of the digital baseband input signal and $F_{LO}$ is the local oscillator (LO) input signal. The frequency $F_{IN}$ of the baseband signal is typically very distant from the frequency $F_{LO}$ of the LO input signal such that the energy of the baseband signal can be ignored as it will be filtered out from the mixer output signal by RF system components located after the mixer output. However, in a real mixer where energy of the LO input signal leaks into the mixer output signal, the energy of the LO input signal cannot be ignored as its frequency sits very close to the output frequencies or frequency bands ($F_{IN}+F_{LO}$ and $F_{IN}-F_{LO}$) of the mixer and would be very difficult to filter out of the mixer output signal. This is a particular issue in Zero-IF systems where both sidebands $[F_{IN}+F_{LO}]$ and $[F_{IN}-F_{LO}]$ are transmitted and the LOL signal sits in the middle of the desired output signal. Any filtering to remove the LOL signal would almost inevitably result in the filtering out of portions of the wanted transmission signal. Filtering is therefore not a feasible option for dealing with the unwanted LOL signal in Zero-IF transmitters or the like.

In orthogonal frequency division multiplex (OFDM) systems, the DC subcarrier is a subcarrier that has no information sent on it, but is used by the receiver to locate the center of the OFDM frequency band.

Known systems typically perform a redundant calibration process to mitigate or estimate LOL. A trial-and-error approach is often adopted due to a lack of baseband processing expertise. Furthermore, the impact of Carrier Frequency Offset (CFO) between the transmitter and the receiver is usually not considered, and thus any LOL estimation is possibly invalid where CFO is present, but ignored.

There is a need therefore to develop a method to simplify a calibration process for, for example, base stations by directly using a wideband baseband signal to perform the calibration process efficiently with the lowest hardware dependency, and to estimate DC offset accurately especially where CFO is present.

It is desirable to obtain a better DC offset calibration in the transmitter and/or receiver. This requires an accurate estimation of DC offset magnitude error and phase error. In addition, the DC offset calibration process should be technically feasible and cost-efficient.

What is desired among other things therefore is a method for estimating LOL for RF transmitters, receivers, or transceivers directly using a wideband baseband signal.

OBJECTS OF THE INVENTION

An object of the invention is to mitigate or obviate to some degree one or more problems associated with known methods of estimating LOL for RF transmitters, receivers, or transceivers.

The above object is met by the combination of features of the main claims; the sub-claims disclose further advantageous embodiments of the invention.

Another object of the invention is to provide a novel method for estimating LOL in Zero-IF systems.

A further object is to provide a novel method of estimating LOL in Zero-IF systems by directly using the wideband baseband signal.

A yet further object of the invention is to provide a novel method for calibrating LOL in Zero-IF systems.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides a method of estimating local oscillator leakage (LOL) for a radio frequency (RF) signal transmitter. The method comprises generating a transmitter wideband baseband signal (s(t)) with a direct current (DC) voltage element of the transmitter wideband baseband signal (s(t)) removed or blocked and an average of the transmitter wideband baseband signal (s(t)) set to zero. The method includes processing said transmitter wideband baseband signal (s(t)) to form an RF signal; processing the RF signal to obtain a receiver baseband signal (y(t)); and determining a magnitude of an average E (y(t)) of the receiver baseband signal (y(t)) as comprising a magnitude of the transmitter DC offset.

In a second main aspect, the invention provides a method of estimating LOL for an RF receiver comprising generating a transmitter wideband baseband signal (s(t)) with a region around a DC element of the transmitter wideband baseband signal (s(t)) removed and an average of the transmitter wideband baseband signal (s(t)) set to zero or generating an empty transmitter wideband baseband signal (s(t)). The method includes processing said transmitter wideband baseband signal (s(t)) to form an RF signal; processing the RF signal to obtain a receiver baseband signal (y(t)); and determining a magnitude of an average E (y(t)) of the receiver baseband signal (y(t)) as comprising at least a magnitude of the receiver DC offset.

In a third main aspect, the invention provides a method of estimating LOL for an RF receiver comprising generating a transmitter wideband baseband signal (s(t)) with no input signal in a timeslot centered on a DC voltage element of the transmitter wideband baseband signal (s(t)). The method includes processing said transmitter wideband baseband signal (s(t)) to form an RF signal; processing the RF signal to obtain a receiver baseband signal (y(t)); and accumulating and averaging a timeslot centered on the DC element of the receiver baseband signal (y(t)) to obtain a magnitude of the accumulated average E (y(t)) of the receiver baseband signal (y(t)) in said timeslot as comprising at least a magnitude of the receiver DC offset.

In a fourth main aspect, the invention provides a network node, device or system in a communications system having a non-transitory computer-readable medium storing machine-readable instructions and a processor configured to execute said machine-readable instructions, wherein, when the machine-readable instructions are executed by the processor, they configure the network node, device, or system to implement the methods of the first to third main aspects of the invention.

In a fifth main aspect, the invention provides a non-transitory computer-readable medium storing machine-readable instructions, wherein, when the machine-readable instructions are executed by a processor, they configure the processor to implement the methods of the first to third main aspects of the invention.

The summary of the invention does not necessarily disclose all the features essential for defining the invention; the invention may reside in a sub-combination of the disclosed features.

The forgoing has outlined fairly broadly the features of the present invention in order that the detailed description of the invention which follows may be better understood. Additional features and advantages of the invention will be described hereinafter which form the subject of the claims of the invention. It will be appreciated by those skilled in the art that the conception and specific embodiment disclosed may be readily utilized as a basis for modifying or designing other structures for carrying out the same purposes of the invention.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
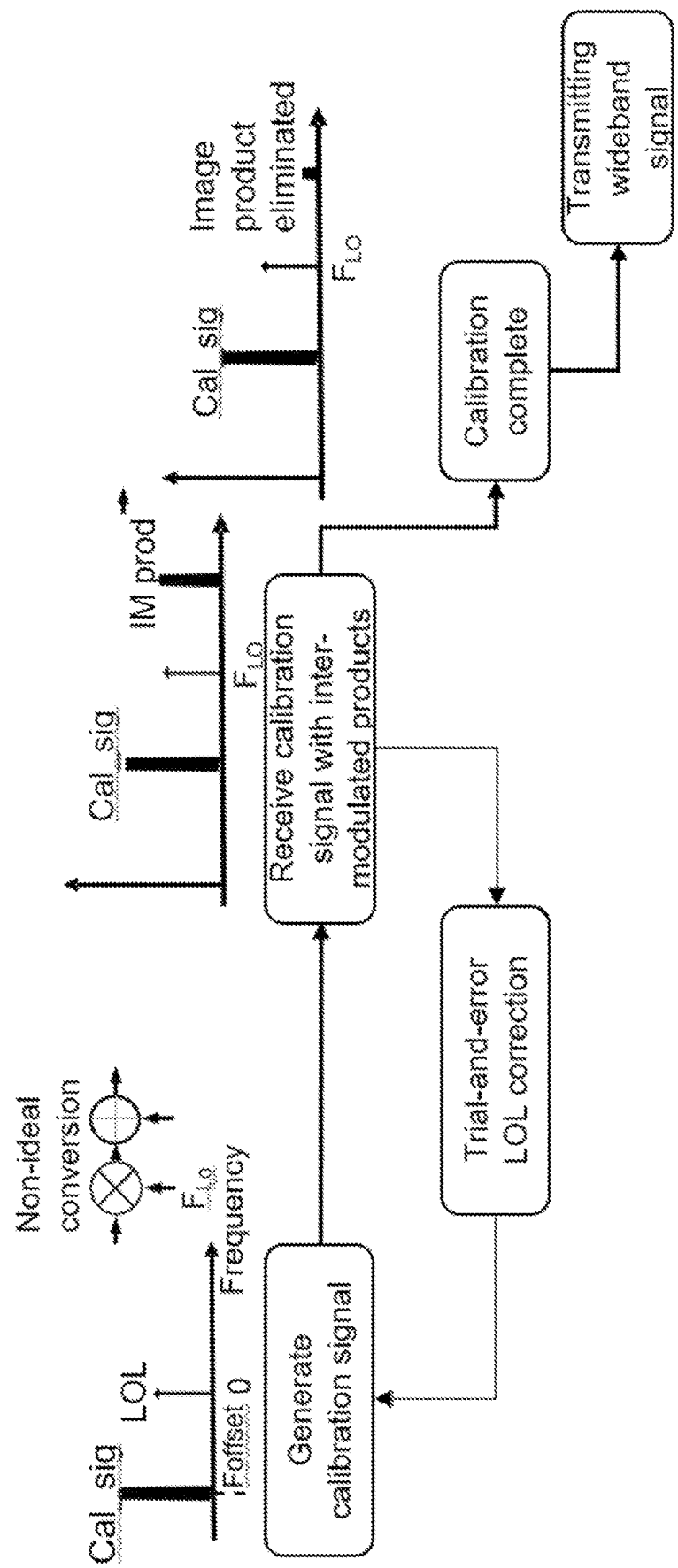
FIG. 1 is a flow diagram illustrating a known method for mitigating LOL in an RF transmitter.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the drawings may be implemented in various forms of hardware, software, or combinations thereof. These elements may be implemented in a combination of hardware and software on one or more appropriately programmed general-purpose devices, which may include a processor, memory, and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode, or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

References to 5G radio equipment in the following description do not exclude the application of the methods described herein to radio equipment of compatible mobile communications systems.

FIG. 1 illustrates a known method for mitigating LOL in an RF transmitter. The known method comprises generating in the transmitter a calibration signal with a predefined frequency offset. The transmitter may form part of a base station, for example. The calibration signal is processed in the transmitter to generate an RF signal for transmission. The RF signal is transmitted to a receiver. The receiver may comprise a user equipment or the like. The receiver processes the received RF signal to obtain the calibration signal which includes inter-modulated signal products related to LOL of at least the transmitter. The receiver makes an estimate of the LOL of the transmitter from the received calibration signal and reports the LOL estimation to the transmitter. This is a trial and error process which requires a very large number of repetitions in the order of hundreds of repetitions to eventually arrive at an acceptable estimation of transmitter LOL sufficient to counter or reduce the transmitter LOL to an acceptable or desired level, i.e., to enable the transmitter to be calibrated to have a reduced level of transmitter LOL signal components in the transmitted RF signal. This known method has many disadvantages including that it is not able to account for CFO between the transmitter and receiver, that it takes a considerable period of time to determine a useful estimation of transmitter LOL, and that it requires additional hardware to generate the calibration signal with the predefined frequency offset.

Figure 2:
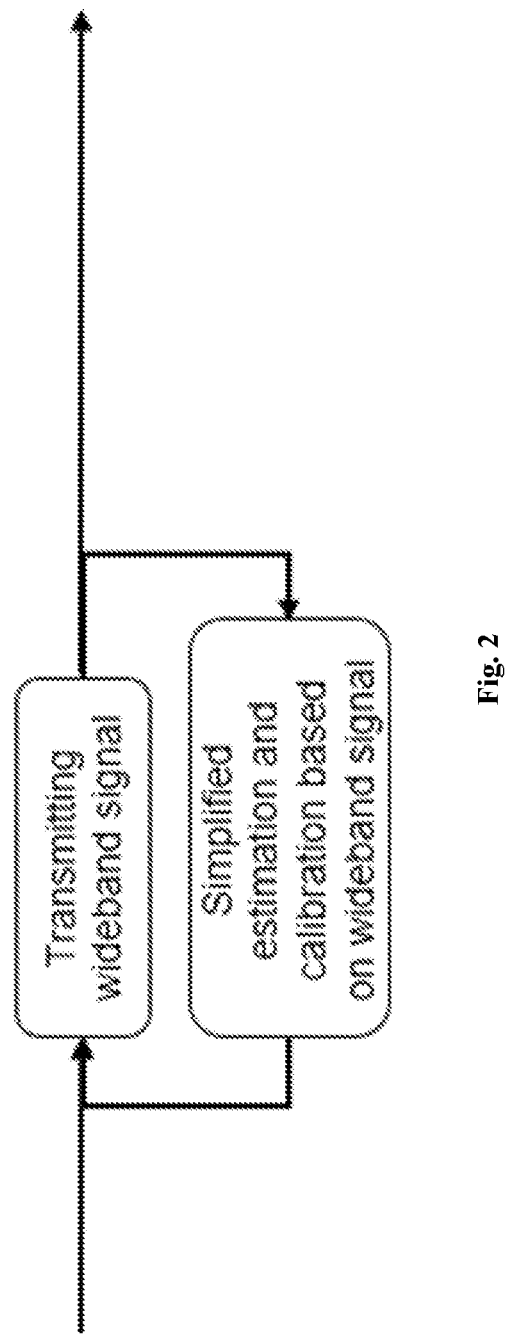
FIG. 2 is a flow diagram illustrating a novel method for mitigating LOL in an RF transmitter in accordance with the invention.

By way of contrast, FIG. 2 illustrates at a general level a novel method for mitigating LOL in an RF transmitter or receiver in accordance with the aspects of the invention. The method directly uses the transmitter wideband baseband signal to simplify the LOL estimation process and thereby simply the calibration process with little or no need for additional hardware. Furthermore, the novel method is able to accurately estimate DC offset in the presence of CFO between the transmitter and receiver.

The aspects of the method in accordance with the invention can be implemented in systems comprising or including suitably enabled RF transmitters, receivers, or transceivers. Examples of such systems are OFDM systems including Long Term Evolution (LTE) communication systems, 5G New Radio (NR) communication systems, Wi-Fi systems, and non-OFDM systems including Code Division Multiple Access (CDMA) communication systems, Global System for Mobile (GSM) communication systems, and Time Division Multiple Access (TDMA) communication systems. The methods can be implemented in any communication device which comprises an RF transmitter, receiver, or transceiver. The methods can be implemented by way of suitable software changes to the machine code controlling operation of such communication devices.

The following description describes implementation of the present invention in various communication system scenarios, by way of example, but without limitation to implementation of the invention in any suitable communications network and in any suitable RF enabled communication device.

Figure 3:
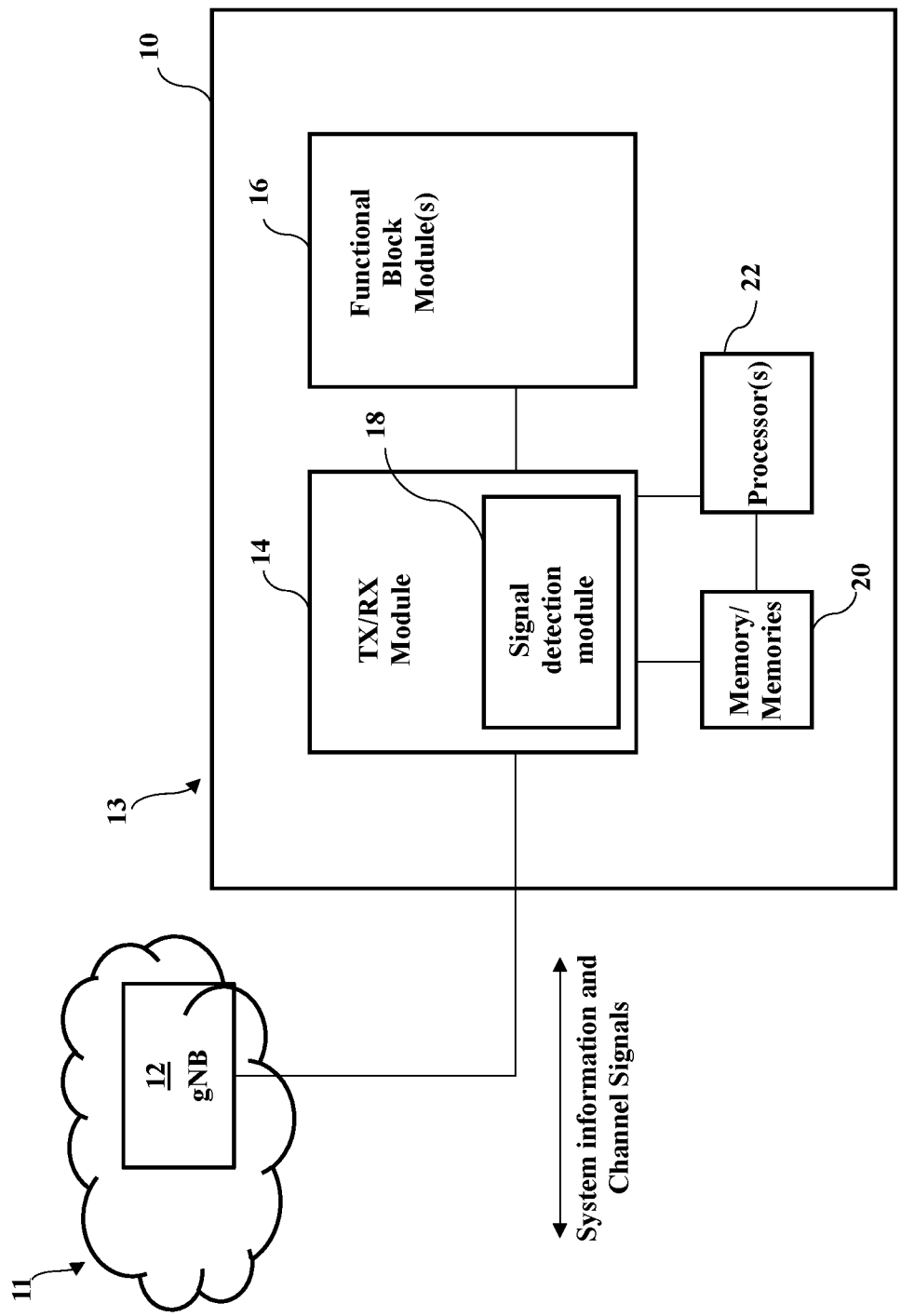
FIG. 3 is a block schematic diagram of an improved radio equipment, device, network node, or system in accordance with the invention.

FIG. 3 is a block schematic diagram of an improved radio equipment, device, network node, or system 10 in accordance with the invention operating in a communications network 11. The improved radio equipment device 10 may itself comprise a base station such as a gNB 12 or it may comprise a user equipment (UE) 13 connected to the gNB 12 operating in, for example, a 5G NR communications system environment, although the improved radio equipment device 10 of the invention is not limited to operating in a NR 5G communications system but could comprise a radio equipment, device, network node or system for any suitable communications network.

Reference hereinafter to "radio equipment device 10" is to be taken as a reference to any of a radio equipment, device, network node, or system.

The radio equipment device 10 may comprise a plurality of functional blocks for performing various functions thereof. For example, the radio equipment device 10 includes a module 14 providing signal processing and configured to provide signals and/or information extracted therefrom to functional block module(s) 16 such as may comprise various data sink, control element(s), user interface(s), etc. Module 14 may comprise a transmitter module providing transmitted signal processing. However, it will be appreciated that this functional block may be implemented as a receiver module providing received signal processing or as a transceiver module providing both transmitted and received signal processing. Irrespective of the particular configuration of module 14, embodiments include signal detection module 18 disposed in association with the module 14 for facilitating accurate processing and/or encoding/decoding of transmitted/received information and channel signals in accordance with the invention.

Although the signal detection module 18 is shown as being deployed as part of the module 14 (e.g., comprising a portion of the radio equipment module control and logic circuits), there is no limitation to such a deployment configuration according to the concepts of the invention. For example, the signal detection module 18 may be deployed as a functional block of radio equipment device 10 that is distinct from, but connected to, module 14. The signal detection module 18 may, for example, be implemented using logic circuits and/or executable code/machine readable instructions stored in a memory 20 of the radio equipment device 10 for execution by a processor 22 to thereby perform functions as described herein. For example, the executable code/machine readable instructions may be stored in one or more memories 20 (e.g., random access memory (RAM), read only memory (ROM), flash memory, magnetic memory, optical memory, or the like) suitable for storing one or more instruction sets (e.g., application software, firmware, operating system, applets, and/or the like), data (e.g., configuration parameters, operating parameters and/or thresholds, collected data, processed data, and/or the like), etc. The one or more memories 20 may comprise processor-readable memories for use with respect to one or more processors 22 operable to execute code segments of signal detection module 18 and/or utilize data provided thereby to perform functions of the signal detection module 18 as described herein. Additionally, or alternatively, the signal detection module 18 may comprise one or more special purpose processors (e.g., application specific integrated circuit (ASIC), field programmable gate array (FPGA), graphics processing unit (GPU), and/or the like configured to perform functions of a transmitter, receiver, or transceiver.

Figure 4:
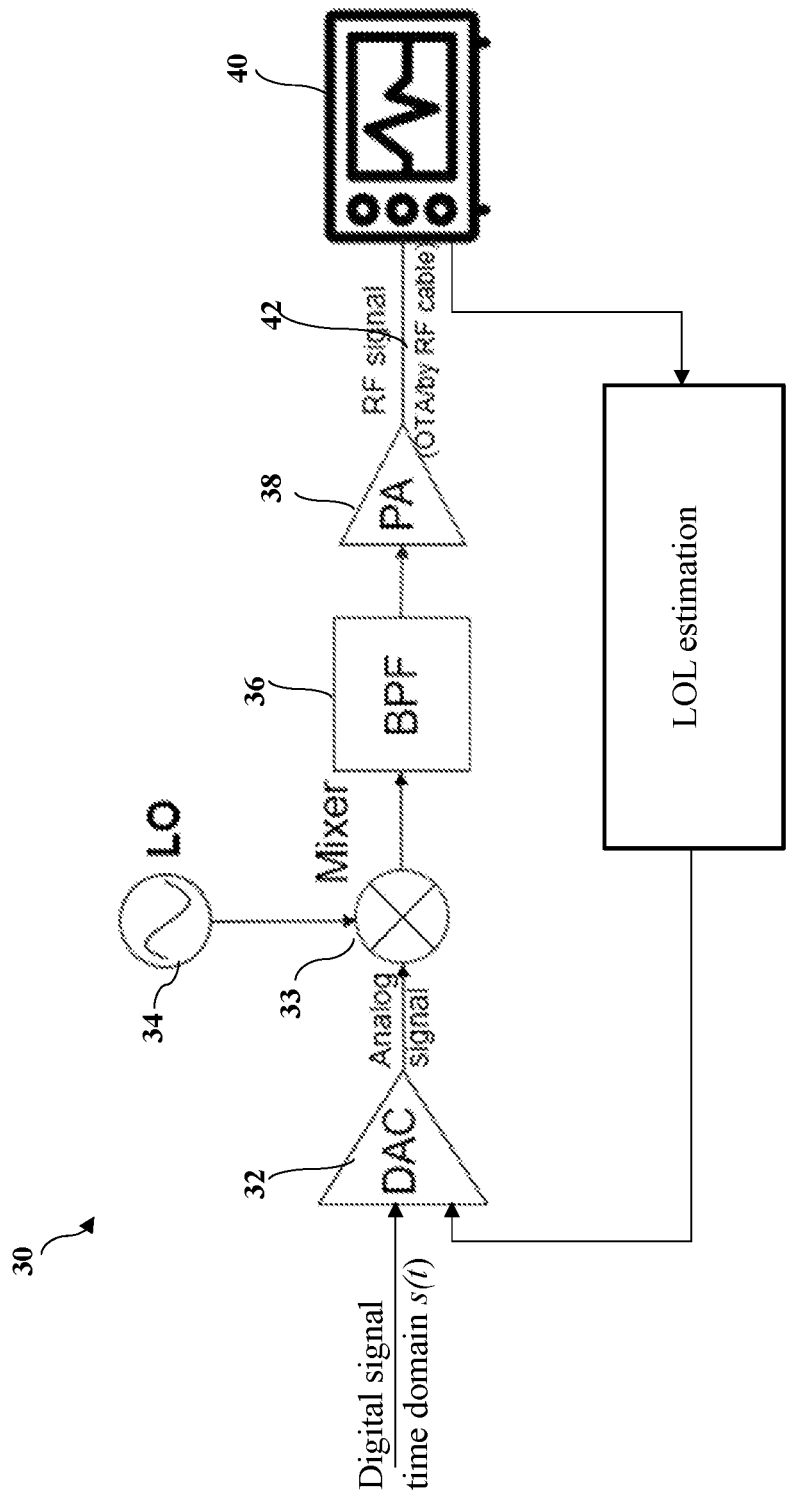
FIG. 4 is a block schematic diagram of an RF transmitter by way of example.

Reference is made to FIG. 4 which provides a block schematic diagram of an RF transmitter 30. The transmitter 30 is preferably a Zero-IF upconverting transmitter. A method in accordance with the invention relates to estimating the LOL for the transmitter 30. A transmitter wideband baseband digital signal in the time domain (s(t)) is converted to an analog signal by a digital to analog converter (DAC) 32 in order that the transmitter wideband baseband signal (s(t)) in its analog form can be upconverted at a mixer 33 by an input signal to the mixer 33 from a local oscillator (LO) 34. The transmitter wideband baseband signal (s(t)) in its analog form is upconverted to two sideband frequencies or frequency bands. The upconverted signal is processed by a band-pass filter (BPF) 36 to filter out the wideband baseband signal (s(t)). Subsequently, the filtered signal is amplified by a power amplifier (PA) 38 to provide the RF signal for transmission. The RF signal may be transmitted wirelessly over the air to a receiver 40 or transmitted to the receiver 40 via an RF cable 42 or by any suitable means.

As already discussed, it is almost inevitable that energy of the LO input signal to the mixer 33 will leak into the mixer output signal resulting in an unwanted LOL signal sitting in the middle of the desired output signal, i.e., sitting between the two sideband frequencies or frequency bands with a frequency very close to said two sideband frequencies or frequency bands. This is a particular problem in Zero-IF transmitters and receivers. This unwanted signal is not filtered out by the BPF 36 and any attempt to filter it out by another filter device would likely filter out portions of the wanted signal.

It is highly desirable to obtain a better DC offset estimation or calibration. Therefore, it is essential to obtain accurate estimations in magnitude (error) and phase (error) for the DC offset. Knowing the magnitude (error) and phase (error) of the transmitter DC offset enables the input to the transmitter 30 to be modified to cancel out or at least reduce the level of the unwanted LOL signal component in the RF transmission signal. It also enables the transmitter 30 to be calibrated using the magnitude error and phase error for the DC offset to mitigate the DC offset problem.

A method for estimating the LOL for the transmitter 30 involves generating the transmitter wideband baseband signal (s(t)) such that a DC element of said transmitter wideband baseband signal (s(t)) is removed or blocked and such that an average E[s(t)] of the transmitter wideband baseband signal (s(t)) is set to zero, i.e., E[s(t)]=0. Where the transmitter 30 is an OFDM transmitter, the DC element of the transmitter wideband baseband signal (s(t)) is preferably removed by setting the OFDM DC subcarrier to zero. Where the transmitter 30 is not an OFDM transmitter, e.g., a CDMA, TDMA, or GSM communication network transmitter, the DC element of the transmitter wideband baseband signal (s(t)) is preferably blocked by filtering the transmitter wideband baseband signal (s(t)) with a high-pass filter (HPF) such that the DC element part of the signal has no energy or power. The transmitter wideband baseband signal (s(t)) is processed as described above to form the RF signal for transmitting to the receiver 40. At the receiver 40, the received RF signal is processed in a known manner by, for example, Zero-IF down converting the RF signal, to obtain a receiver baseband signal (y(t)).

It will be understood that, in an ideal scenario, the receiver baseband signal (y(t)) will be identical to the transmitter wideband baseband signal (s(t) without any LOL induced signal. However, in a real-world scenario, it will be appreciated that the receiver baseband signal (y(t)) will include the unwanted LOL signal caused by leakage from the LO 34.

The method includes determining at the receiver 40 a magnitude r of an average E[y(t)] of the receiver baseband signal (y(t)), i.e., r=|E[y(t)]|. The determined magnitude value r is taken as comprising a magnitude of the transmitter DC offset (LOL). The phase θ of the transmitter DC offset (LOL) may also be determined at the receiver 40 from the receiver baseband signal (y(t)). A preferred method for determining the phase θ of the transmitter DC offset will hereinafter be described.

The LOL estimation or DC offset estimation, i.e., the magnitude r of the transmitter DC offset and the phase θ of the DC transmitter DC offset, may be relayed by the receiver 40 to the transmitter 30 to enable calibration signals or values to be generated as inputs at the transmitter 30 to mitigate LOL in the RF signal.

The magnitude r and phase θ of the transmitter DC offset or calibration values based thereon can be applied as appropriate digital DC inputs to the transmitter 30 to calibrate the transmitter 30 to cancel or significantly reduce the LOL signal caused by the LO 34 in the mixer output signal.

Figure 5:
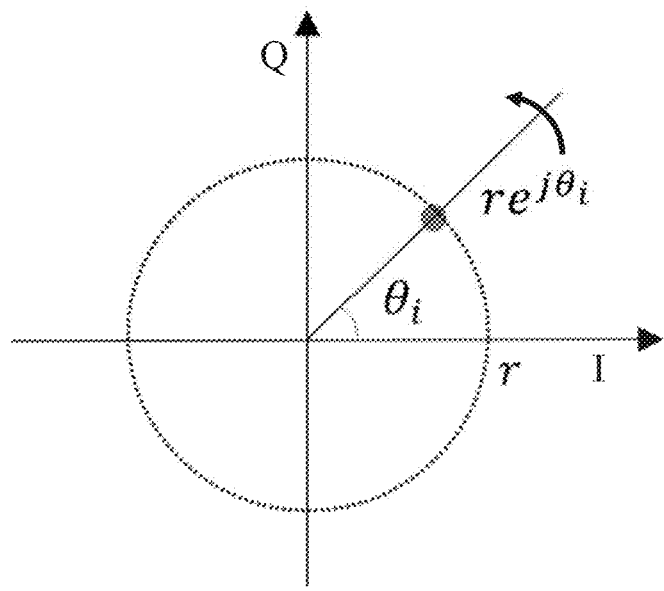
FIG. 5 illustrates the formation of a preferred DC element.

A preferred method of estimating the phase θ of the transmitter DC offset comprises generating at the transmitter 30 a plurality of modified transmitter wideband baseband signals ($\tilde{s}_i(t)$) by adding respective DC elements $re^{j\theta_i}$ to the original transmitter wideband baseband signal (s(t)). FIG. 5 illustrates the formation of a preferred DC element $re^{j\theta_i}$.

Each of the respective DC elements $re^{j\theta_i}$ comprises the determined magnitude r of the transmitter DC offset, but having different values of phase $\theta_i$, such that the plurality of modified transmitter wideband baseband signals ($\tilde{s}_i(t)$) are given by:

$$\tilde{s}_i(t) = s(t) + re^{j\theta_i}.$$

The plurality of modified transmitter wideband baseband signals ($\tilde{s}_i(t)$) is each processed to form a respective RF signal. The RF signals are processed at the receiver 40 to obtain respective receiver baseband signals ($\tilde{y}_i(t)$). The method includes determining respective magnitudes $\tilde{r}_i$ of the averages of the respective receiver baseband signals ($\tilde{y}_i(t)$). A phase θ value is obtained from the receiver baseband signal ($\tilde{y}_i(t)$) which is determined to have a least magnitude of average signal value $\tilde{r}_i = |E[\tilde{y}_i(t)]|$. The phase θ of the transmitter DC offset is derived from $$\theta = \arg\min_{\theta_i} \tilde{r}_i.$$

The phase of the DC offset comprises θ+π, where $\theta_i = \theta + \pi$ and where $\theta_i$ is the phase value taken from the receiver baseband signal ($\tilde{y}_i(t)$) which is determined to have a least magnitude of average signal value $\tilde{r}_i = |E[\tilde{y}_i(t)]|$. In this method, the respective DC elements $re^{j\theta_i}$ may comprise calibration vectors.

In some embodiments, the least magnitude $\tilde{r}_i$ value may be taken itself as a new value for the transmitter DC offset magnitude.

Figure 6:
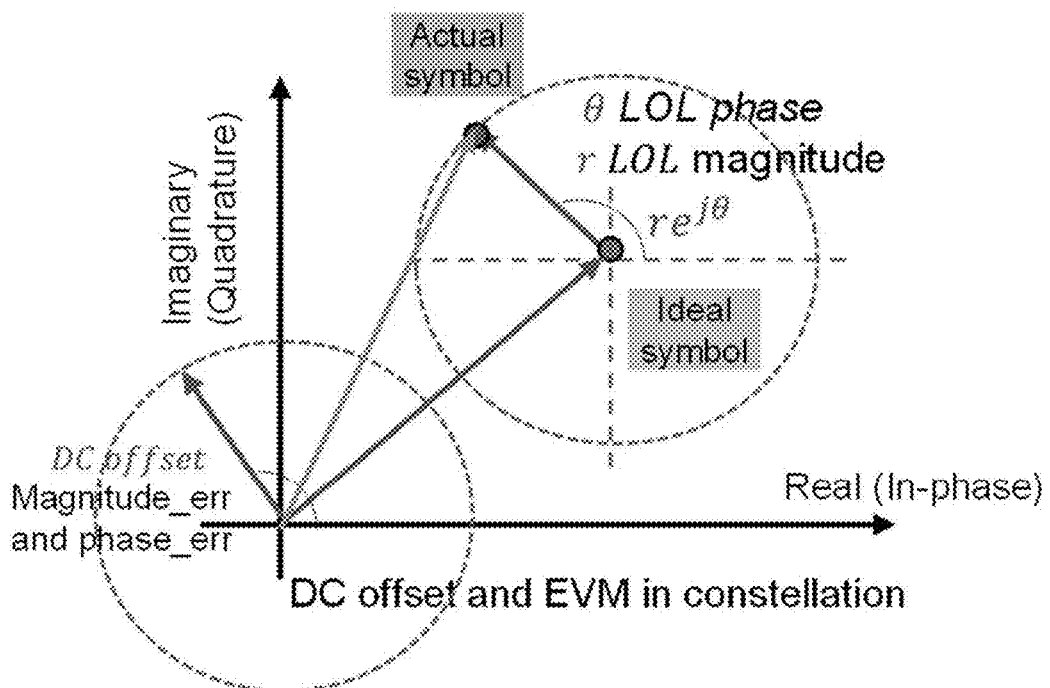
FIG. 6 illustrates transmitter DC offset with error vector magnitude (EVM) in an OFDM system.

FIG. 6 illustrates the transmitter DC offset with error vector magnitude (EVM) in an OFDM system where:

$$EVM = \sqrt{\frac{\sum_{n=0}^{N-1}(\text{Re}_{err}^2[n] + \text{Im}_{err}^2[n])}{N}},$$

where N is the number of OFDM symbols and n is the index or number of the symbol.

Figure 7:
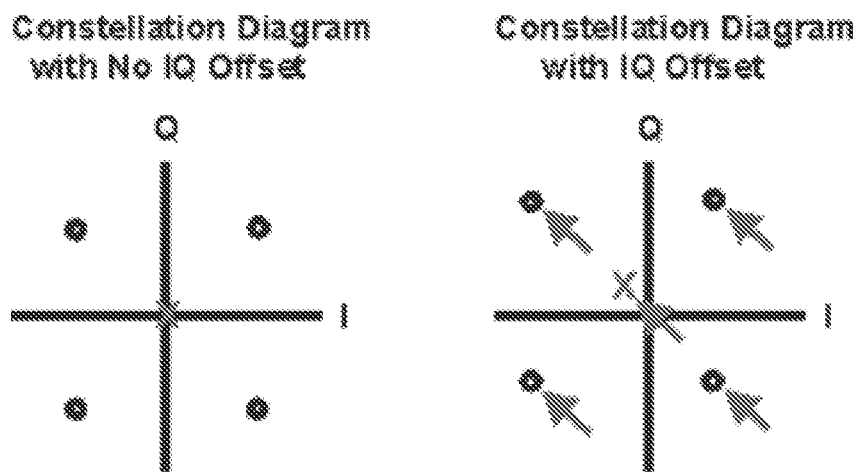
FIG. 7 provides constellation diagrams with and without IQ offset.

The transmitter DC offset degrades the constellation which affects modulation quality. This is illustrated in FIG. 7.

Figure 8:
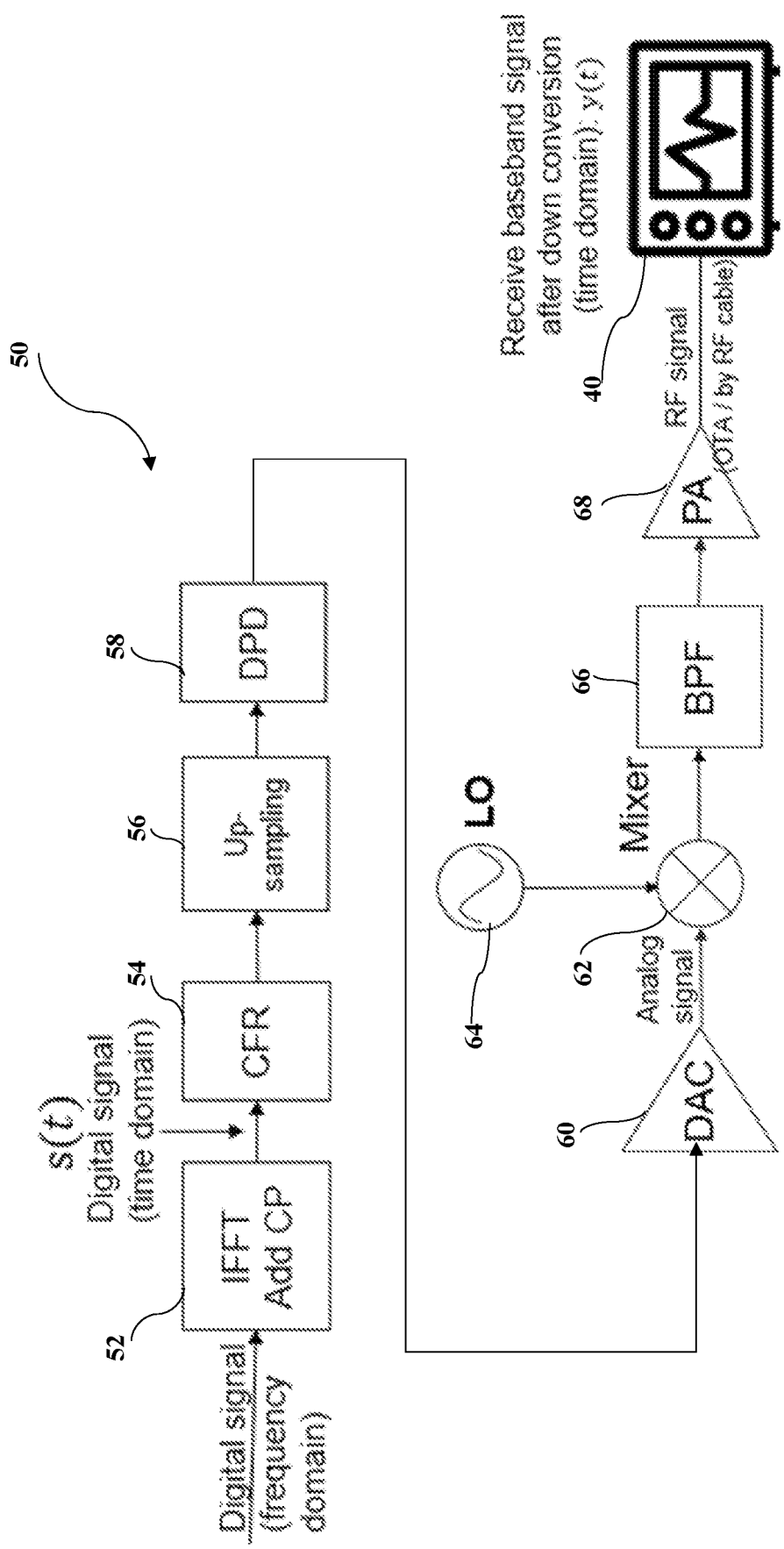
FIG. 8 illustrates, by way of example, an OFDM transmitter.

FIG. 8 illustrates, by way of example, an OFDM transmitter 50 in which the method in accordance with the invention can be implemented. The transmitter 50 comprises an inverse Fast Fourier transform module 52 with cyclic prefix (CP) to convert the transmitter wideband baseband signal in the frequency domain (f(t)) into the transmitter wideband baseband signal in the time domain (s(t)). Other digital signal processing modules include a crest factor reduction (CFR) module 54, an upsampling module 56 and a digital pre-distortion (DPD) module 58. The digital processing modules 52-58 feed the digital signal to a digital to analog converter (DAC) module 60. The DAC module 60 is followed by analog signal processing modules including a mixer 62, an LO module 64, BPF module 66 and a PA module 68. The RF signal is transmitted to the receiver 40 in a known manner.

Figure 9:
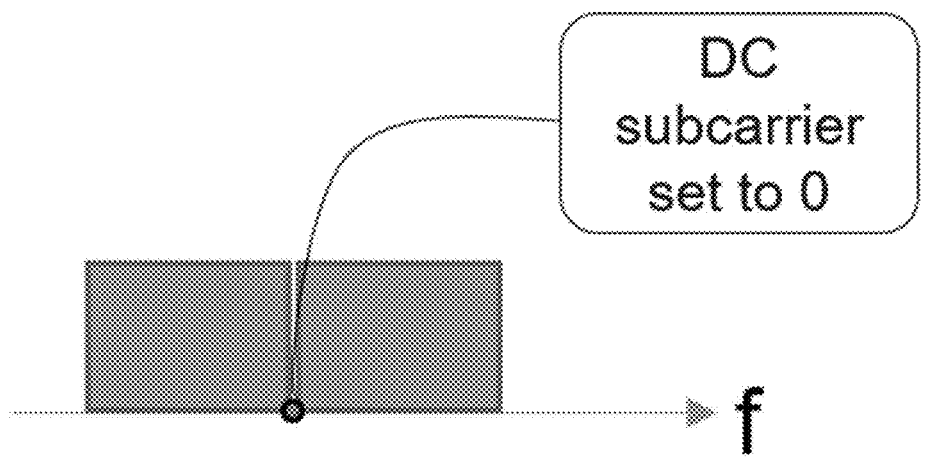
FIG. 9 illustrates a DC subcarrier being set to zero in the transmitter wideband baseband signal in the frequency domain (f(t))

FIG. 9 illustrates that the DC subcarrier in the transmitter wideband baseband signal in the frequency domain (f(t)) is set to zero for implementation of the method. This can be achieved by removing the DC subcarrier. The method enables $r = |E[y(t)]|$ to be determined for the transmitter DC offset.

Figure 10:
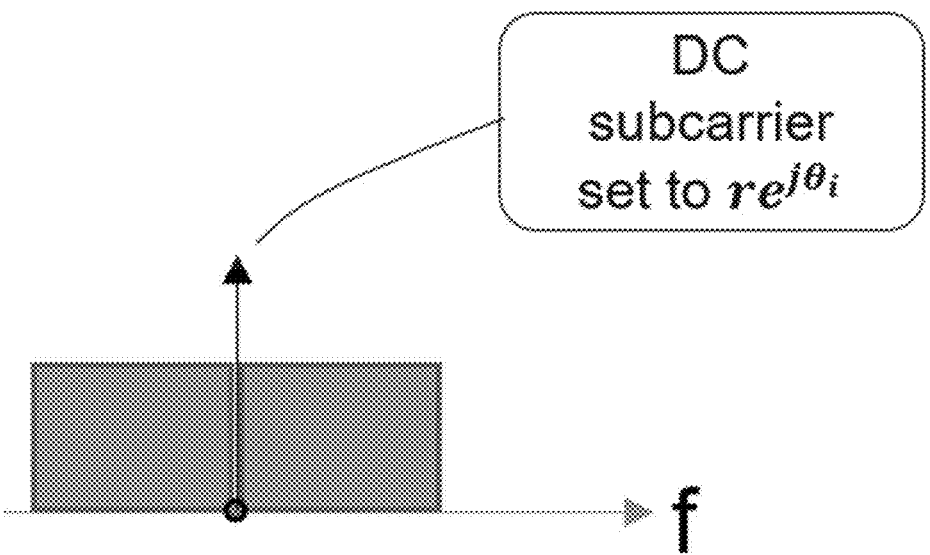
FIG. 10 illustrates the generation of a plurality of modified transmitter wideband baseband signals ($\tilde{s}_i(t)$) by adding respective DC elements $re^{j\theta_i}$.

FIG. 10 illustrates the generation of the plurality of modified transmitter wideband baseband signals ($\tilde{s}_i(t)$) by adding respective DC elements $re^{j\theta_i}$ to the transmitter wideband baseband signal in the frequency domain (f(t)), i.e., setting the DC subcarrier to different values of phase $\theta_i$ but with the same magnitude value r. It will be noted that the respective DC elements $re^{j\theta_i}$ are added to the original transmitter wideband baseband signal when it is in the frequency domain. The method steps as hereinbefore described for generating and processing the plurality of modified transmitter wideband baseband signals ($\tilde{s}_i(t)$) enables $\tilde{r}_i = |E[\tilde{y}_i(t)]|$ and $$\theta = \arg\min_{\theta_i} \tilde{r}_i$$

to be determined for the transmitter DC offset.

The method when implemented in an OFDM system preferably includes taking account of EVM. EVM is a useful metric that helps gauge the impact of all impairments simultaneously from a single value and is useful for measuring the performance of a transmitter or receiver.

A first step of generating the plurality of modified transmitter wideband baseband signals ($\tilde{s}_i(t)$) comprises determining the phase values $\theta_i$ for the respective DC elements or calibration elements $re^{j\theta_i}$ to be added to the transmitter wideband baseband signal. This includes determining or selecting a value of phase calibration granularity or phase granularity (PG) in degrees of rotation, e.g., PG=10 degrees. PG comprises a relationship of phase step and EVM. PG provides a useful trade-off between the granularity of a number N of the plurality of modified transmitter wideband baseband signals ($\tilde{s}_i(t)$) to be generated and a minimum set or number of phase values $\theta_i$ for completing calibration, i.e., obtaining estimates of LOL for the transmitter, at a best or optimal cost-performance. A value of PG may be determined or selected by generating an EVM versus phase chart for the transmitter and determining or selecting a value of PG from the chart which provides the best EVM results whilst respecting the above trade-off. Decoding of the OFDM signal is not necessary.

Figure 11A:
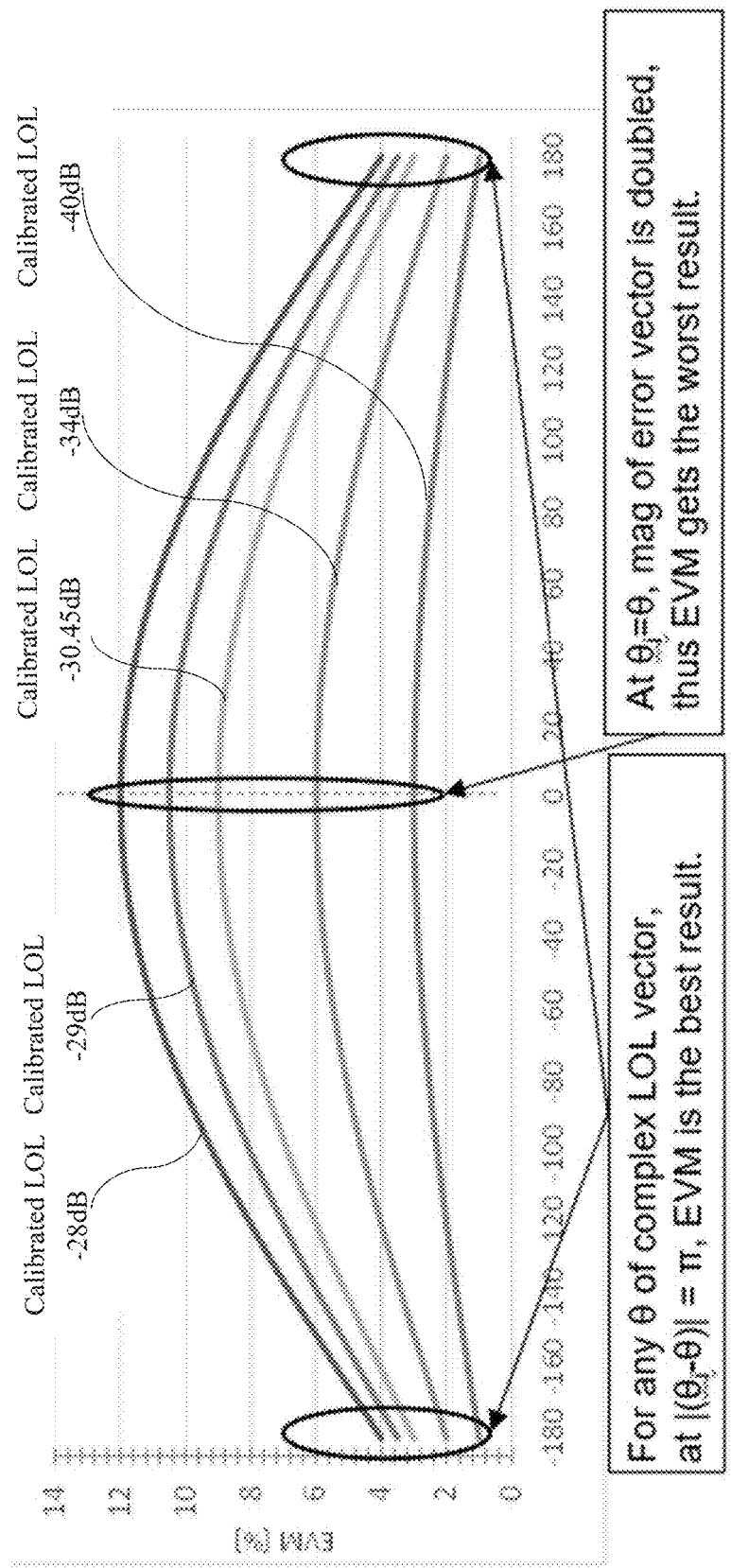
FIG. 11A is a graph of EVM versus different phase values [%] for different calibrated LOLs where the calibrated LOL is the EVM without calibration.
Figure 11B:
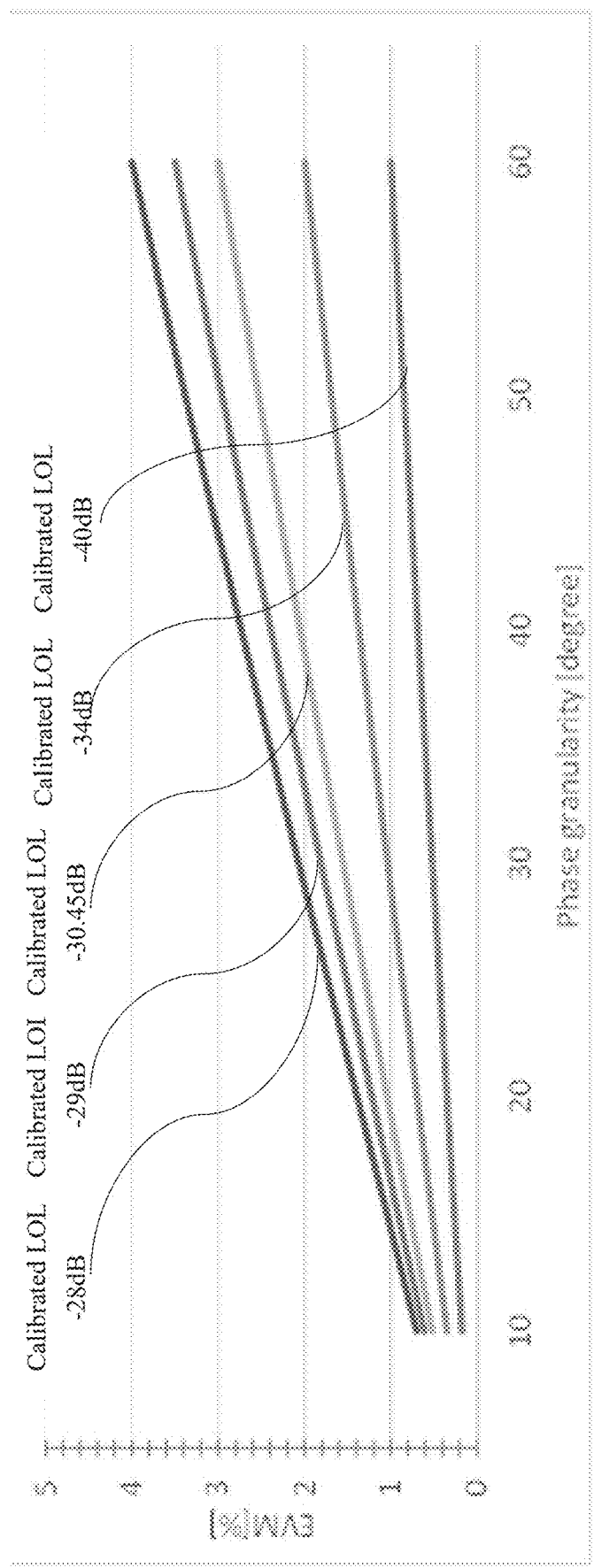
FIG. 11B is a graph of EVM versus phase granularity [%] for the same different calibrated LOLs as FIG. 11A.

FIG. 11A is a graph of EVM [%] versus different phase values for different calibrated LOLs where the calibrated LOL is the EVM without calibration. The graph illustrates that, at $\theta_i = \theta$, the magnitude of the error vector is doubled, thus the EVM provides the worst result. In contrast, for any value of 0 of the complex LOL vector, at $|(\theta_i - \theta)| = \pi$, the EVM is the best result. FIG. 11B is a graph of EVM versus phase granularity [%] for the same different calibrated LOLs as FIG. 11A. A value of PG can be determined or selected from this graph based on the results illustrated by the graph of FIG. 11A.

The method includes generating the DC elements as calibration vectors $re^{j\theta_i}$ by using the previously determined transmitter DC offset magnitude r and the phase values $\theta_i$ for the respective calibration vectors $re^{j\theta_i}$, where the number N of phase values $\theta_i$ is limited by N=360/PG. Thus, in the above example where PG=10 degrees, the number of phase values $\theta_i$ and consequently the number of the plurality of modified transmitter wideband baseband signals ($\tilde{s}_i(t)$)=36. In this example, the receiver is required to process 36 RF signals generated from the 36 modified transmitter wideband baseband signals ($\tilde{s}_i(t)$) which is an order of magnitude less than the number of signal processing procedures required by the known trial and error process of FIG. 1.

Figure 12:
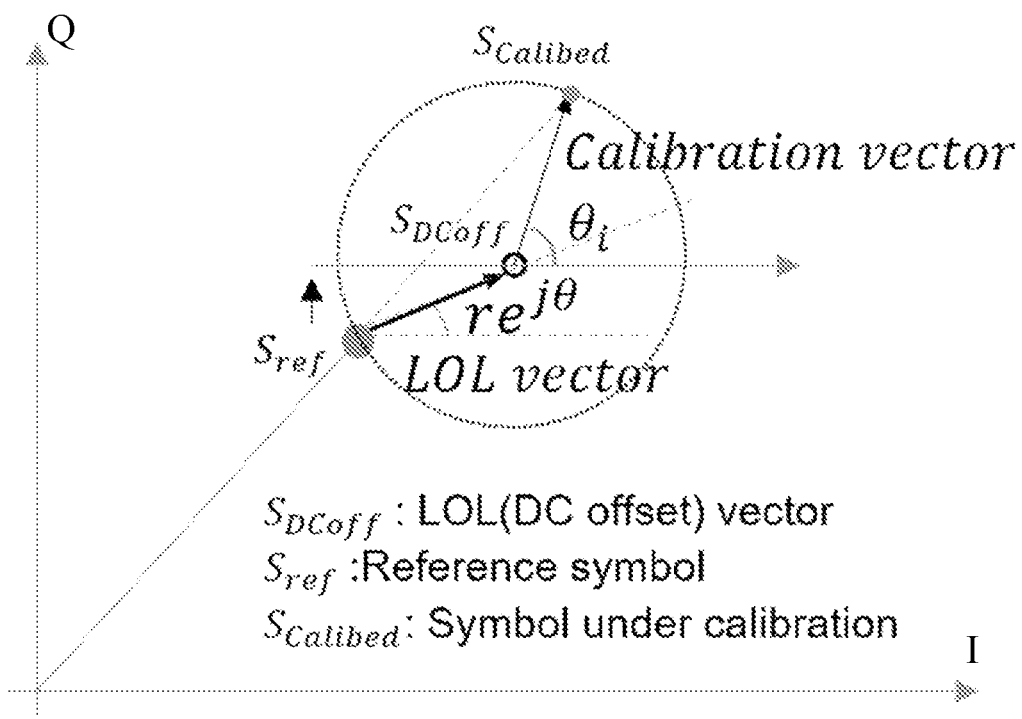
FIG. 12 is a diagram showing an LOL vector and its calibration vector.

Referring to FIG. 12, it can be inferred that the calibration vectors having different phase values of $\theta_i$ are employed in an attempt to determine a phase value $\theta_i$ which results in a lowest DC offset magnitude in the receiver 40. The phase value $\theta$ of the DC offset in the transmitter 50 can then be obtained from $\theta_i = \theta + \pi$.

It can be derived from FIG. 12 that:

$$\text{EVM\_wo\_cali} = \frac{|S_{DCoff} - S_{ref}|}{|S_{ref}|} = \frac{r}{|S_{ref}|}$$

and

EVM_phase_cali =

$$\frac{|S_{calied} - S_{ref}|}{|S_{ref}|} = \frac{2r\cos\left[\frac{(\theta_i - \theta)}{2}\right]}{|S_{ref}|} = 2\cos\left[\frac{(\theta_i - \theta)}{2}\right] * \text{EVM\_wo\_cali};$$

where:
EVM_wo_cali: EVM due to LOL without any calibration;
EVM_phase_cali: EVM after phase calibrated;
$\theta_i$: Phase of calibration vector; and
$\theta$: Phase of LOL vector.

Referring again to FIG. 5, it is observed that the DC offset for the transmitter rotates where CFO ($\Delta F$) exists between the transmitter and receiver. As a result, the magnitude of the transmitter DC offset may become inaccurate. In the method, it is preferred that the signal duration for determining the magnitude of the transmitter DC offset should be not so large that CFO has a noticeable impact. In other words, the signal duration should be such that the impact of CFO on the determination of the transmitter DC offset is negligible or minimal. As such, it is preferred that the duration of the receiver baseband signal (y(t)) is limited to being no larger than $1/20 \cdot \Delta F$, where $\Delta F$ is a maximum value of CFO between the transmitter and the receiver.

Another method of mitigating the effect of CFO on the determination of the transmitter DC offset is to pre-compensate the CFO before calculating the magnitude of the DC offset, e.g., the average of the received baseband signal can be calculated as: $E[y(t)e^{-2\pi \cdot \Delta F \cdot t}]$ and the magnitude of the transmitter DC offset can be obtained as:

$$r = |E[y(t)e^{-j2\pi \cdot \Delta F \cdot t}]|;$$

where r is the value of the magnitude of the average E of the receiver baseband signal (y(t)); and
$e^{-j2\pi \cdot \Delta F \cdot t}$ is the phase of the receiver baseband signal (y(t)).

In the case of maximum CFO $\Delta F$, the method may include for OFDM systems setting the DC subcarrier and adjacent subcarriers to zero. The adjacent subcarriers comprise the subcarriers having a subcarrier index $$-3\left[\left|\frac{\Delta F}{f_{sc}}\right|\right] \sim 3\left[\left|\frac{\Delta F}{f_{sc}}\right|\right]$$

where $f_{SC}$ is a subcarrier spacing of the transmitter baseband signal (s(t)).

The method may also include calibrating the receiver to have no DC offset and/or no IQ imbalance.

Figure 13:
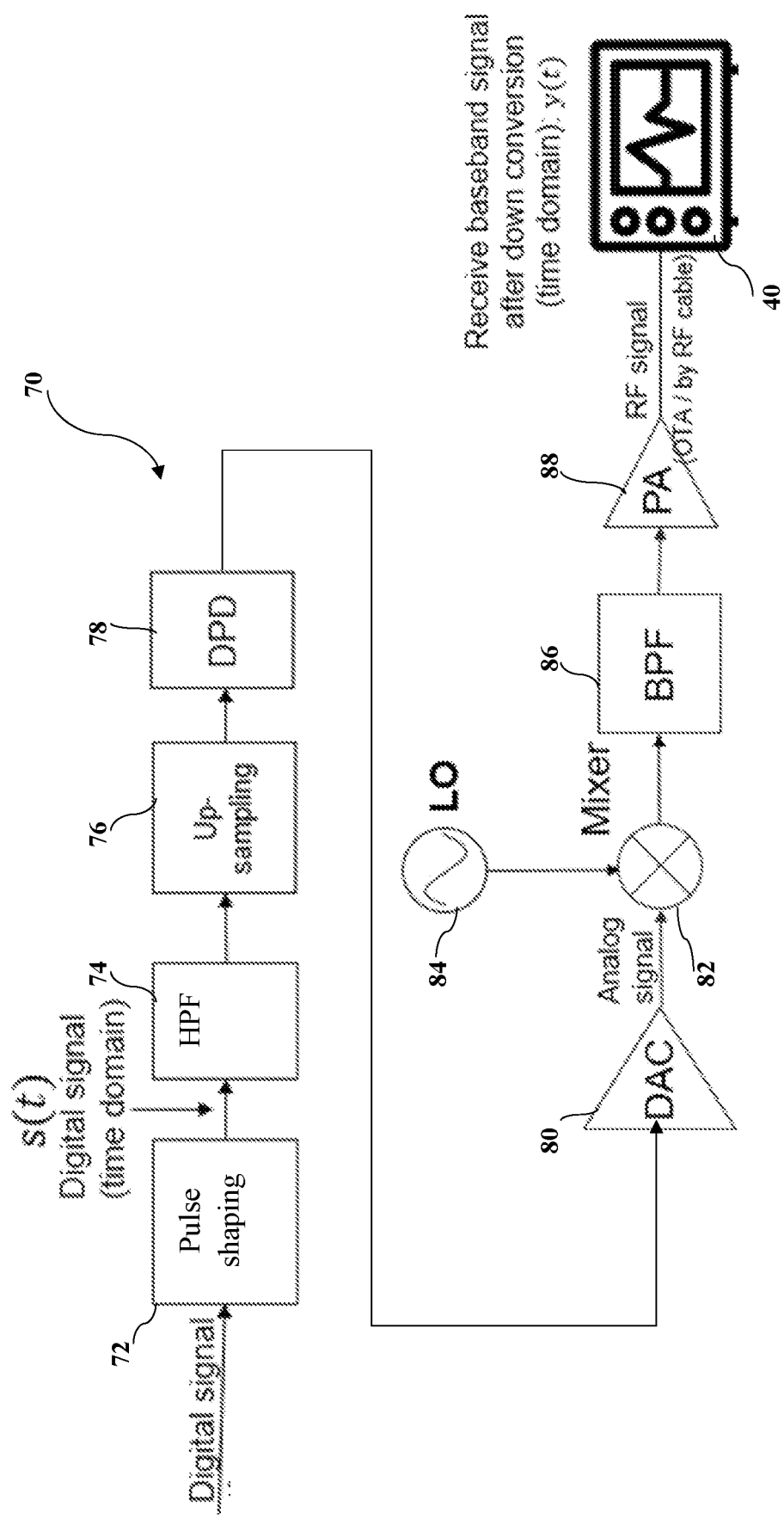
FIG. 13 illustrates, by way of example, a non-OFDM transmitter.

FIG. 13 illustrates, by way of example, a non-OFDM transmitter 70 in which the method in accordance with the invention can be implemented. The transmitter 70 comprises pulse shaping module 72 to convert the transmitter wideband baseband signal in the frequency domain (f(t)) into the transmitter wideband baseband signal in the time domain (s(t)). Other digital signal processing modules include a high-pass filter (HPF) module 74, an upsampling module 76 and a digital pre-distortion (DPD) module 78. The digital processing modules feed the digital signal to a digital to analog converter (DAC) module 80. The DAC module 80 is followed by analog signal processing modules including a mixer 82, an LO module 84, BPF module 86 and a PA module 88. The RF signal is transmitted to the receiver 40 in a known manner.

In the case of maximum CFO $\Delta F$, the method may include for non-OFDM systems, filtering the transmitter wideband baseband signal (s(t)) by the HPF 74 to have zero power in a frequency range range $$\left[-\frac{1}{2}\Delta F, \frac{1}{2}\Delta F\right]$$

centered on the DC element of the transmitter wideband baseband signal (s(t)).

Figure 14A:
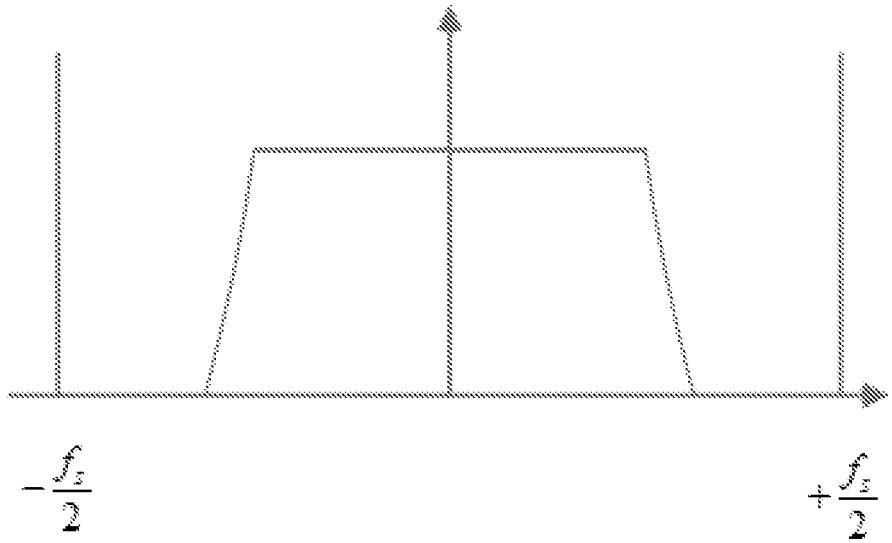
FIG. 14A shows the spectrum of the non-OFDM digital signal in the time domain (s(t)).

FIG. 14A shows the spectrum of the digital signal in the time domain (s(t)) for the transmitter 70.

Figure 14B:
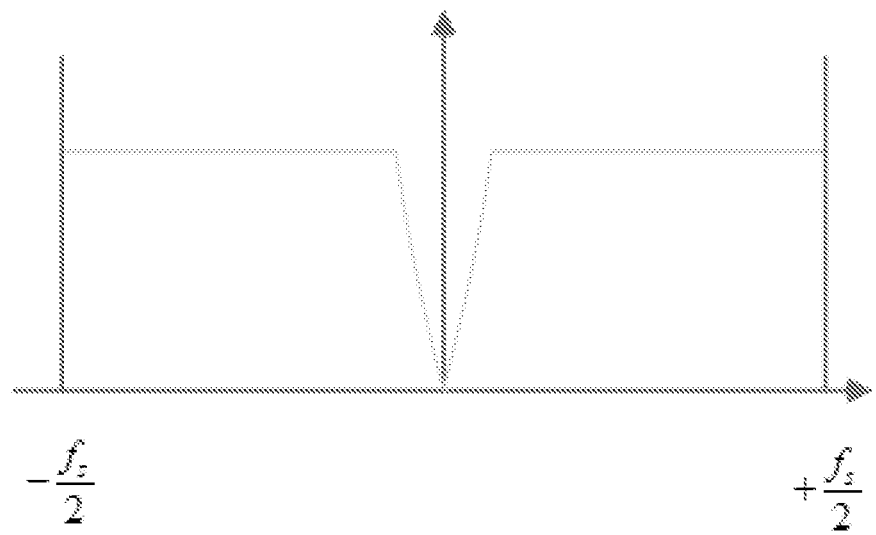
FIG. 14B shows the frequency response of the HPF module 74.

FIG. 14B shows the frequency response of the HPF module 74.

Figure 14C:
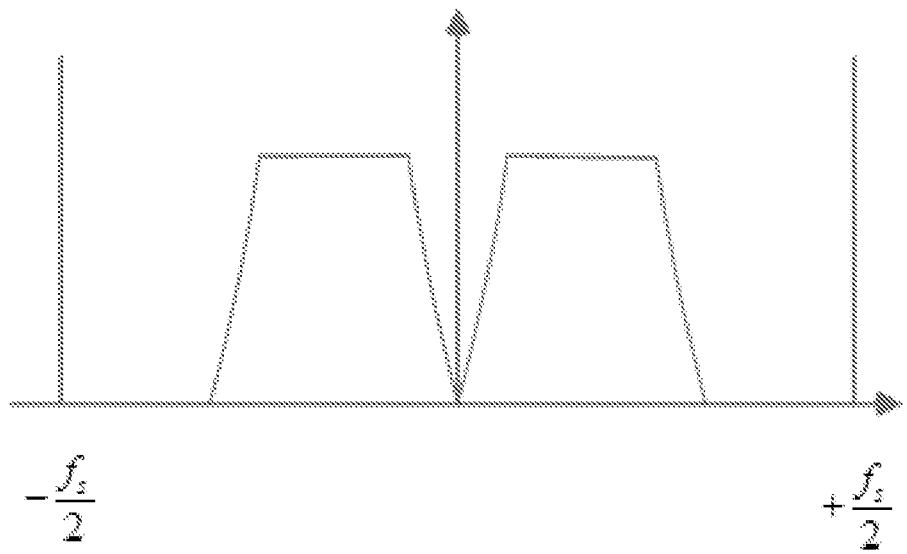
FIG. 14C shows the spectrum of the non-OFDM digital signal (s(t)) after DC suppression.

FIG. 14C shows the spectrum of the digital signal (s(t)) after DC suppression.

Figure 14D:
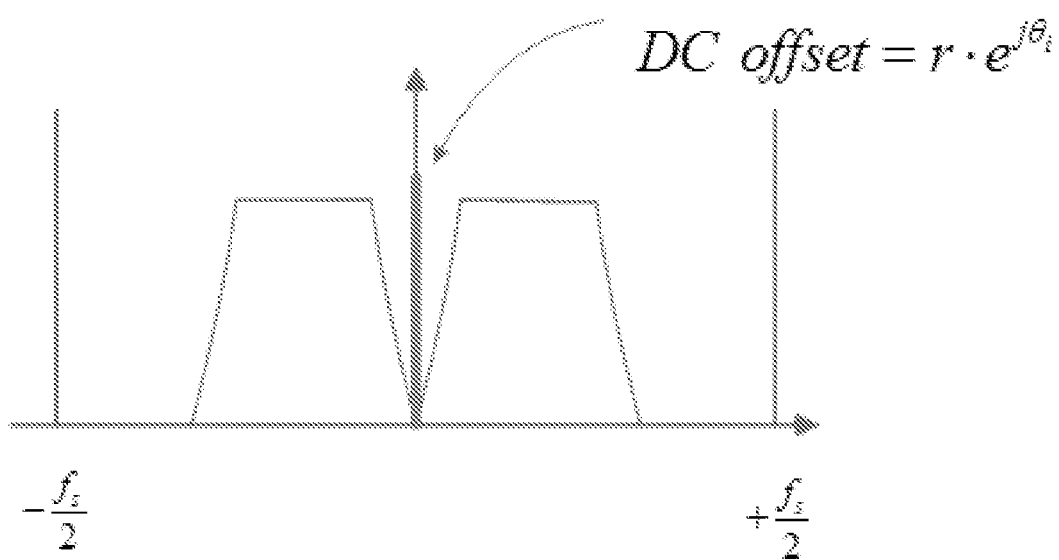
FIG. 14D shows the spectrum of the non-OFDM digital signal (s(t)) after the BPF module 86, and where the digital signal (s(t)) includes a DC offset signal due to LOL.

FIG. 14D shows the spectrum of the digital signal (s(t)) after the BPF module 86, and where the digital signal (s(t)) includes a DC offset signal due to LOL.

The method of the invention may be modified for implementation in the receiver 40 for determining the DC offset of the receiver 40.

For an OFDM system, the method comprises generating a transmitter wideband baseband signal (s(t)) with a region around a DC element of the transmitter wideband baseband signal (s(t)) removed and an average of the transmitter wideband baseband signal (s(t)) set to zero or generating an empty transmitter baseband signal (s(t)). The method includes processing said transmitter wideband baseband signal (s(t)) to form a RF signal and then, at the receiver 40, processing the RF signal to obtain a receiver baseband signal (y(t)). The receiver 40 determines a magnitude of an average of the receiver baseband signal (y(t)) as comprising a magnitude of the receiver DC offset and the phase of the received signal as the phase of the receiver DC offset.

The step of determining the magnitude of the average of the receiver baseband signal (y(t)) preferably comprises accumulating the determined average of the receiver baseband signal (y(t)) at the DC subcarrier.

The region around the DC element is preferably removed by setting the DC subcarrier and adjacent subcarriers to zero. The adjacent subcarriers comprise the subcarriers having a subcarrier index $$-3\left[\left|\frac{\Delta F}{f_{sc}}\right|\right] \sim 3\left[\left|\frac{\Delta F}{f_{sc}}\right|\right]$$

where $f_{SC}$ is a subcarrier spacing of the transmitter wideband baseband signal (s(t)) and where ΔF is a maximum value of CFO between the transmitter and the receiver. It should be noted that the receiver DC offset is not affected by CFO as the DC region $$\left[-3\left\lceil\left|\frac{\Delta F}{f_{sc}}\right|\right\rceil \sim 3\left\lceil\left|\frac{\Delta F}{f_{sc}}\right|\right\rceil\right]$$

is blocked in the transmitter.

Figure 15:
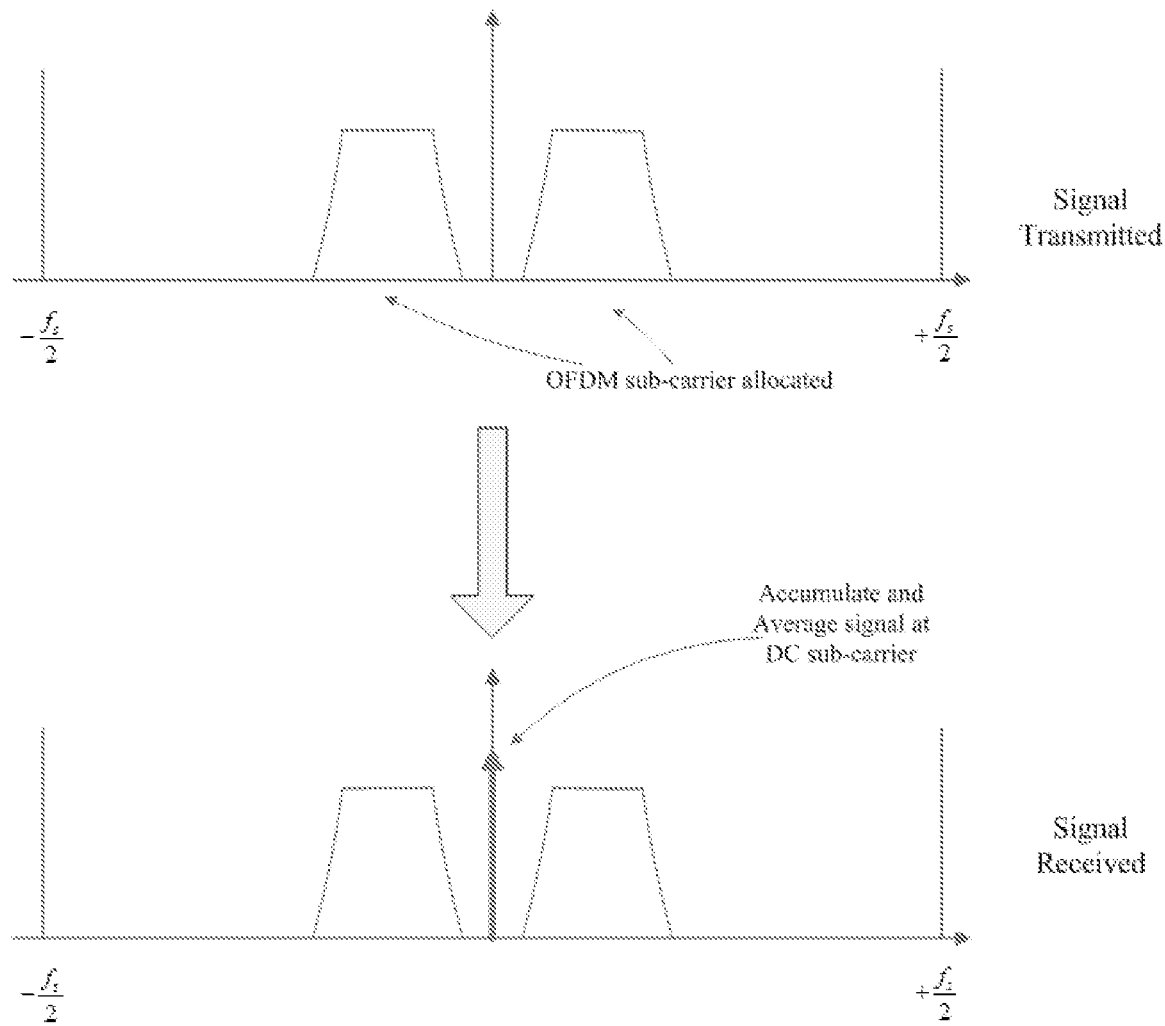
FIG. 15 shows the spectrums of the OFDM transmitted signal and the received signal.

FIG. 15 shows the spectrums of the transmitted signal and the received signal, where the received signal has DC offset induced by the receiver LO 64.

For a non-OFDM system such as a CDMA, GSM, or TDMA system, the method comprises generating a transmitter wideband baseband signal (s(t)) with no input signal in a timeslot centered on a direct current (DC) voltage element of the transmitter wideband baseband signal (s(t)). The method includes processing said transmitter wideband baseband signal (s(t)) to form a RF signal then, at the receiver 40, processing the RF signal to obtain a receiver baseband signal (y(t)). The receiver 40 accumulates and averages a timeslot centered on the DC element of the receiver baseband signal (y(t)) to obtain a magnitude of the accumulated average as comprising a magnitude of the receiver DC offset and the phase of the received signal as the phase of the receiver DC offset.

Figure 16:
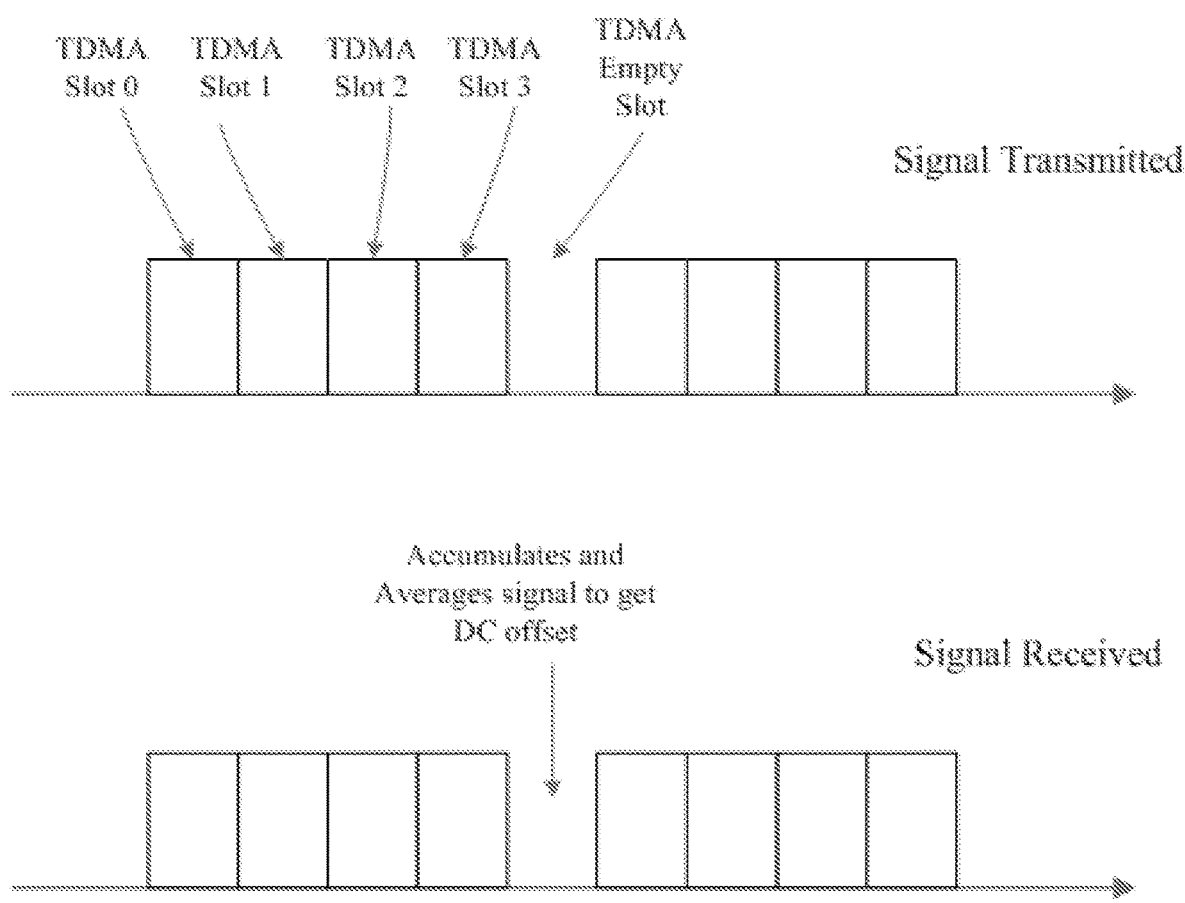
FIG. 16 shows the timeslot arrangement of the non-OFDM transmitted signal and the received signal.

FIG. 16 shows the timeslot arrangement of the transmitted signal and the received signal.

Figure 17A:
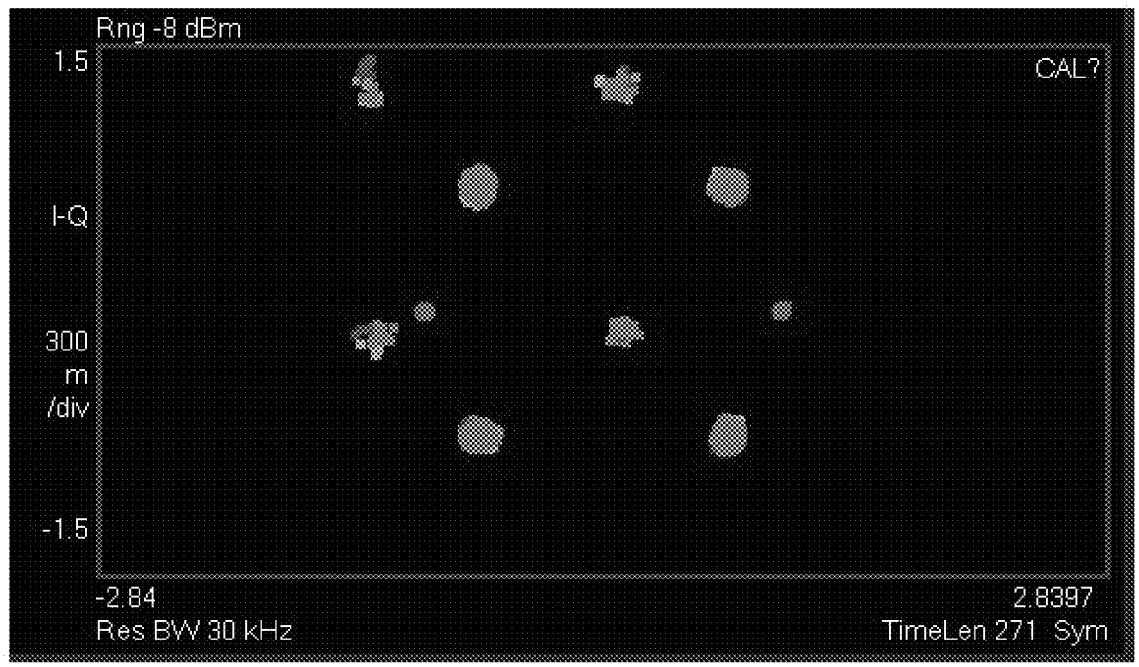
FIG. 17A shows the OFDM symbol constellation before the calibration method of the invention is implemented.
Figure 17B:
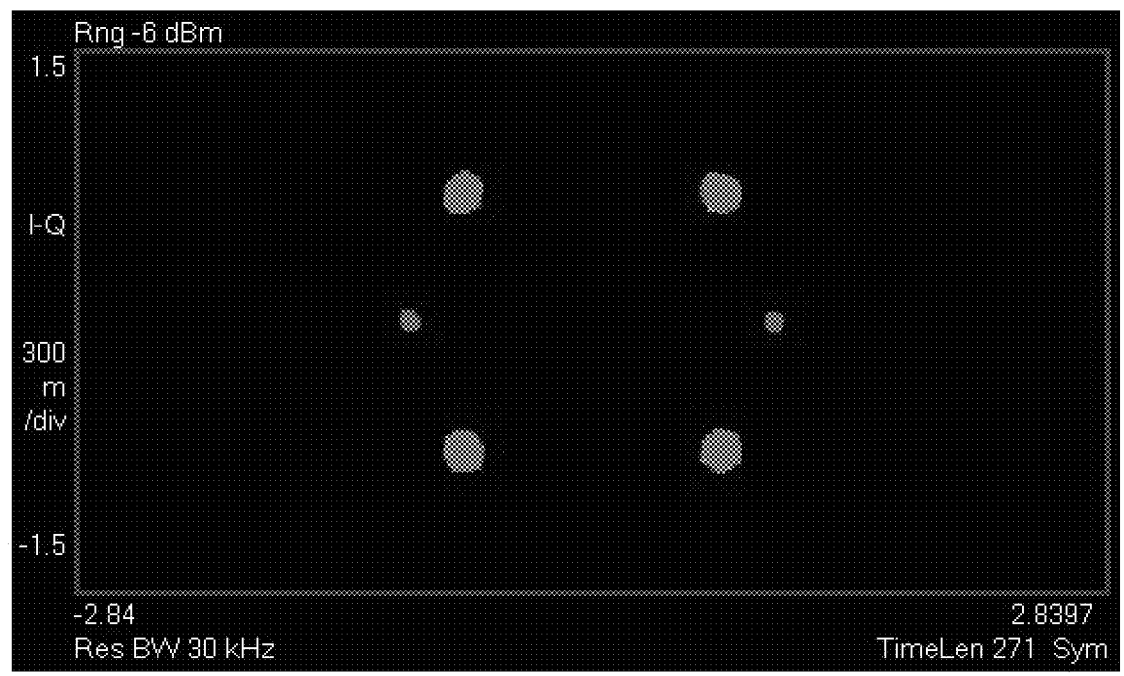
FIG. 17B shows the OFDM symbol constellation after the calibration method of the invention is implemented.

FIG. 17A shows the OFDM symbol constellation before the calibration method of the invention is implemented. The EVM has a value of 4.96% with a DC offset of −19 dB. In contrast, FIG. 17B shows the OFDM symbol constellation after the calibration method of the invention is implemented. Here, the EVM has a value of 1.89% with a significantly improved DC offset of −41 dB.

The invention provides a network node, device or system in a communications system or network having a non-transitory computer-readable medium storing machine-readable instructions and a processor configured to execute said machine-readable instructions, wherein, when the machine-readable instructions are executed by the processor, they configure the network node, device, or system to implement the method of any one of the appended method claims.

The invention also provides a non-transitory computer-readable medium storing machine-readable instructions, wherein, when the machine-readable instructions are executed by a processor, they configure the processor to implement the method of any one of the appended method claims.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine-readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein.

Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of estimating local oscillator leakage (LOL) for a radio frequency (RF) signal transmitter, the method comprising the steps of:
   generating a transmitter wideband baseband signal (s(t)) with a direct current (DC) voltage element of the transmitter wideband baseband signal (s(t)) removed or blocked and an average of the transmitter wideband baseband signal (s(t)) set to zero;
   processing said transmitter wideband baseband signal (s(t)) to form an RF signal;
   processing the RF signal to obtain a receiver baseband signal (y(t)); and
   determining a magnitude of an average of the receiver baseband signal (y(t)) as comprising a magnitude of the transmitter DC offset.

2. The method of claim 1, wherein the transmitter is an orthogonal frequency division multiplex (OFDM) transmitter and the DC element of the transmitter wideband baseband signal (s(t)) is removed by setting an OFDM DC subcarrier to zero.

3. The method of claim 1, wherein the transmitter is not an orthogonal frequency division multiplex (OFDM) transmitter and the DC element of the transmitter wideband baseband signal (s(t)) is blocked by filtering the transmitter wideband baseband signal (s(t)) with a high-pass filter.

4. The method of claim 3, wherein a cutoff frequency of the high-pass filter is equal to a maximum carrier frequency offset (CFO) between the transmitter and the receiver.

5. The method of claim 1, wherein a phase θ of the transmitter DC offset is determined by:
generating a plurality of modified transmitter wideband baseband signals ($\tilde{s}_i(t)$) by adding respective DC elements to the transmitter wideband baseband signal (s(t)), each of the plurality of modified transmitter wideband baseband signals ($\tilde{s}_i(t)$) comprising the determined magnitude of the transmitter DC offset, but having different values of phase;
processing the modified transmitter wideband baseband signals ($\tilde{s}_i(t)$) to form respective RF signals;
processing the RF signals to obtain respective receiver baseband signals ($\tilde{y}_i(t)$);
determining respective magnitudes of the averages of the receiver baseband signals ($\tilde{y}_i(t)$); and
obtaining the phase θ of the transmitter DC offset from the receiver baseband signal ($\tilde{y}_i(t)$) having a least magnitude of average signal.

6. The method of claim 5, wherein, for an OFDM transmitter, the respective DC elements to be added to the transmitter wideband baseband signal (s(t)) to generate the plurality of modified transmitter wideband baseband signals ($\tilde{s}_i(t)$) comprise respective calibration vectors comprising the magnitude r of the transmitter DC offset and a respective phase value $\theta_i$, the respective phase values $\theta_i$ being determined by the steps of:
determine or select a value of phase granularity (PG) in degrees of rotation;
based on the determined or selected value of PG, generate the respective phase $\theta_i$ for each DC element from:
N=360/PG, where N is the number of respective DC elements; and
$\theta_i$=n×PG where n=[0, 1, 2, ... N−1];
the method comprising obtaining the phase θ of the transmitter DC offset from the receiver baseband signal ($\tilde{y}_i(t)$) having a least magnitude of average signal.

7. The method of claim 6, wherein the phase θ of the transmitter DC offset is obtained from $\theta_i$=θ+π, where $\theta_i$ is the phase value of the receiver baseband signal ($\tilde{y}_i(t)$) having a least magnitude of average signal.

8. The method of claim 6, wherein the value of PG is determined or selected based on a balance between error vector magnitude (EVM) improvement and PG.

9. The method of claim 2, wherein, for the step of determining the magnitude of the average of the receiver baseband signal (y(t)), a duration of the receiver baseband signal (y(t)) is limited to being no larger than 1/20·ΔF, where ΔF is a maximum value of CFO between the transmitter and the receiver.

10. The method of claim 2, wherein the magnitude of the average of the receiver baseband signal (y(t)) is determined from:

$$r = |E[y(t)e^{-j2\pi \cdot \Delta F \cdot L}]|,$$

where:
r is the value of the magnitude of the average E of the receiver baseband signal (y(t));
$e^{-j2\pi \cdot \Delta F \cdot t}$ is the phase of the receiver baseband signal (y(t)); and
ΔF is a maximum value of CFO between the transmitter and the receiver.

11. The method of claim 2, wherein the DC subcarrier and adjacent subcarriers are set to zero.

12. The method of claim 11, wherein the adjacent subcarriers comprise the subcarriers having a subcarrier index in a range from $$-3\left[\left|\frac{\Delta F}{f_{sc}}\right|\right] \sim 3\left[\left|\frac{\Delta F}{f_{sc}}\right|\right]$$

where $f_{SC}$ is a subcarrier spacing of the transmitter baseband signal (s(t)) and where ΔF is a maximum value of CFO between the transmitter and the receiver.

13. The method of claim 3, wherein the transmitter wideband baseband signal (s(t)) is filtered by the high-pass filter to have zero power in a frequency range $$\left[-\frac{1}{2}\Delta F, \frac{1}{2}\Delta F\right]$$

centered on the DC element of the transmitter wideband baseband signal (s(t)) and where ΔF is a maximum value of CFO between the transmitter and the receiver.

14. The method of claim 1, wherein the receiver is calibrated to have no DC offset and/or IQ imbalance.

15. A method of estimating local oscillator leakage (LOL) for a radio frequency (RF) signal receiver, the method comprising the steps of:
generating a transmitter wideband baseband signal (s(t)) with a region around a direct current (DC) voltage element of the transmitter wideband baseband signal (s(t)) removed and an average of the transmitter wideband baseband signal (s(t)) set to zero or generating an empty transmitter baseband signal (s(t));
processing said transmitter wideband baseband signal (s(t)) to form a RF signal;
processing the RF signal to obtain a receiver baseband signal (y(t)); and
determining a magnitude of an average of the receiver baseband signal (y(t)) as comprising at least a magnitude of the receiver DC offset.

16. The method of claim 15, wherein, for an OFDM transmitter, the step of determining the magnitude of the average of the receiver baseband signal (y(t)) comprises accumulating the determined average of the receiver baseband signal (y(t)) at the DC subcarrier.

17. The method of claim 15, including obtaining a phase of the receiver DC offset from the receiver baseband signal (y(t)).

18. The method of claim 15, wherein, for an OFDM transmitter, the region around the DC element is removed by setting the DC subcarrier and adjacent subcarriers to zero.

19. The method of claim 15, wherein, for an OFDM transmitter, the adjacent subcarriers comprise the subcarriers having a subcarrier index in a range from $$-3\left[\left|\frac{\Delta F}{f_{sc}}\right|\right] \sim 3\left[\left|\frac{\Delta F}{f_{sc}}\right|\right]$$

where $f_{SC}$ is a subcarrier spacing of the transmitter wideband baseband signal (s(t)) and where ΔF is a maximum value of CFO between the transmitter and the receiver.

20. A method of estimating local oscillator leakage (LOL) for a radio frequency (RF) signal receiver, the method comprising the steps of:
   generating a transmitter wideband baseband signal (s(t)) with no input signal in a timeslot centered on a direct current (DC) voltage element of the transmitter wideband baseband signal (s(t));
   processing said transmitter wideband baseband signal (s(t)) to form a RF signal;
   processing the RF signal to obtain a receiver baseband signal (y(t)); and
   accumulating and averaging a timeslot centered on the DC element of the receiver baseband signal (y(t)) to obtain a magnitude of the accumulated average as comprising at least a magnitude of the receiver DC offset.

* * * * *